US011682909B2

United States Patent
Zheng et al.

(10) Patent No.: US 11,682,909 B2
(45) Date of Patent: Jun. 20, 2023

(54) MULTI-BATTERY SYSTEM AND MANAGEMENT THEREOF

(71) Applicant: SZ DJI TECHNOLOGY CO., LTD., Shenzhen (CN)

(72) Inventors: Dayang Zheng, Shenzhen (CN); Wentao Wang, Shenzhen (CN); Lei Wang, Shenzhen (CN); Hao Luo, Shenzhen (CN); Jie Tian, Shenzhen (CN); Chaobin Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 163 days.

(21) Appl. No.: 17/137,308

(22) Filed: Dec. 29, 2020

(65) Prior Publication Data

US 2021/0151999 A1 May 20, 2021

Related U.S. Application Data

(63) Continuation of application No. 16/054,051, filed on Aug. 3, 2018, now Pat. No. 10,886,759, which is a
(Continued)

(51) Int. Cl.
*H02J 7/00* (2006.01)
*H01M 10/42* (2006.01)

(52) U.S. Cl.
CPC ........ *H02J 7/00036* (2020.01); *H02J 7/0013* (2013.01); *H02J 7/0031* (2013.01);
(Continued)

(58) Field of Classification Search
CPC ...... H02J 7/0013; H02J 7/0025; H02J 7/0031; H02J 7/0036; H02J 7/0063; H02J 7/00036; H02J 7/00047; H01M 10/4257
(Continued)

(56) References Cited

U.S. PATENT DOCUMENTS 10,886,759 B2 * 1/2021 Zheng ................... H02J 7/0031
11,139,660 B2 * 10/2021 Wang ...................... B60L 53/62
(Continued)

FOREIGN PATENT DOCUMENTS

CN 102593893 A 7/2012
CN 102832657 A 12/2012
(Continued)

OTHER PUBLICATIONS

The World Intellectual Property Organization (WIPO) International Search Report and Written Opinion for PCT/CN2016/105806 dated Jul. 28, 2017 8 Pages.

*Primary Examiner* — Edward Tso
*Assistant Examiner* — Aaron Piggush
(74) *Attorney, Agent, or Firm* — Anova Law Group, PLLC

(57) ABSTRACT

A movable platform includes one or more propulsion units configured to provide a driving force to the movable platform and a control unit operatively coupled to the one or more propulsion units. The control unit is configured to: communicate with a plurality of batteries adapted to supply current to the one or more propulsion units; obtain one or more electrical characteristics of each of the plurality of batteries; and determine, based on the electrical characteristics, a controlling signal to set a power supply state for at least one of the plurality of batteries.

15 Claims, 14 Drawing Sheets

Related U.S. Application Data continuation of application No. PCT/CN2016/105806, filed on Nov. 14, 2016.

(52) U.S. Cl.
CPC ....... *H02J 7/0063* (2013.01); *H01M 10/4257* (2013.01); *H02J 7/0025* (2020.01); *H02J 7/0036* (2013.01)

(58) Field of Classification Search
USPC .................................. 320/134, 136, 162, 163
See application file for complete search history.

(56) References Cited

U.S. PATENT DOCUMENTS

| | | | |
|---|---|---|---|
| 2012/0056597 A1 | 3/2012 | Nagase | |
| 2012/0319657 A1* | 12/2012 | Ke | H02J 7/0047 320/134 |
| 2013/0088094 A1 | 4/2013 | Paik | |
| 2013/0253715 A1* | 9/2013 | Cho | H04Q 9/00 700/286 |
| 2014/0253045 A1 | 9/2014 | Poznar | |
| 2016/0261127 A1* | 9/2016 | Worry | G01R 31/3842 |
| 2016/0303989 A1 | 10/2016 | Lei et al. | |

FOREIGN PATENT DOCUMENTS

| | | |
|---|---|---|
| CN | 103563210 A | 2/2014 |
| CN | 104037878 A | 9/2014 |
| CN | 104242385 A | 12/2014 |
| CN | 104580654 A | 4/2015 |
| CN | 104917253 A | 9/2015 |
| CN | 105098898 A | 11/2015 |
| CN | 205199822 U | 5/2016 |
| CN | 105871036 A | 8/2016 |
| CN | 206442128 U | 8/2017 |
| WO | 2014075285 A1 | 5/2014 |
| WO | 2016062284 A1 | 4/2016 |

* cited by examiner

MULTI-BATTERY SYSTEM AND MANAGEMENT THEREOF

CROSS-REFERENCE TO RELATED APPLICATION

This application is a continuation of U.S. application Ser. No. 16/054,051, filed on Aug. 3, 2018, which is a continuation of International Application No. PCT/CN2016/105806, filed on Nov. 14, 2016, the entire contents of all of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Electrical equipment often requires series-connected or parallel-connected batteries. However, integration of multiple batteries presents safety and compatibility challenges. One example of a device that uses multiple batteries is an electric car. Another example is an unmanned vehicle such as unmanned aerial vehicle (UAV). Unmanned vehicles typically include a propulsion system for remote controlled and/or autonomous movement in the surrounding environment. For example, the unmanned vehicles may have a power supply that powers a device of the unmanned vehicle, such as the propulsion system. Existing systems of battery or power output control, however, are less than ideal.

SUMMARY

The present disclosure provides systems and methods of use thereof for safe and reliable operation of multi-battery systems. In one embodiment, a multi-battery system of the present disclosure does not have a physical power switch that allows a person to manually turn on the charges from the batteries. In some embodiments, even if a power switch is equipped, the system relies on commands from a battery management system that is in electric communication with the batteries.

In accordance with another embodiment of the disclosure, systems and methods are provided that inspect the batteries in the system to ensure that the voltages and charges of the battery within desirable ranges. Only after certain conditions for the voltages and charges are satisfied, is the battery system instructed to supply power.

Another safety measure, in one embodiment, is to employ the use of an in-place signal (e.g., a direct current signal or a pulse signal) indicating whether the battery system is connected to a device for which the battery is supposed to supply power. Before the correct placement, the battery system is not allowed to output current that might cause damage to the device.

New designs for electric communication circuits are also provided which can help reduce cables or connectors and still ensure safety. For instance, one such design includes a separator between a battery and a battery management circuit. While avoiding or at least reducing surge or errors in communication, the separator does not have negative impact on the signal being transmitted. In another embodiment, separate pathways or terminals may be used for supplying power of different voltages.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the disclosure are utilized, and the accompanying drawings of which:

DETAILED DESCRIPTION

Figure 1:
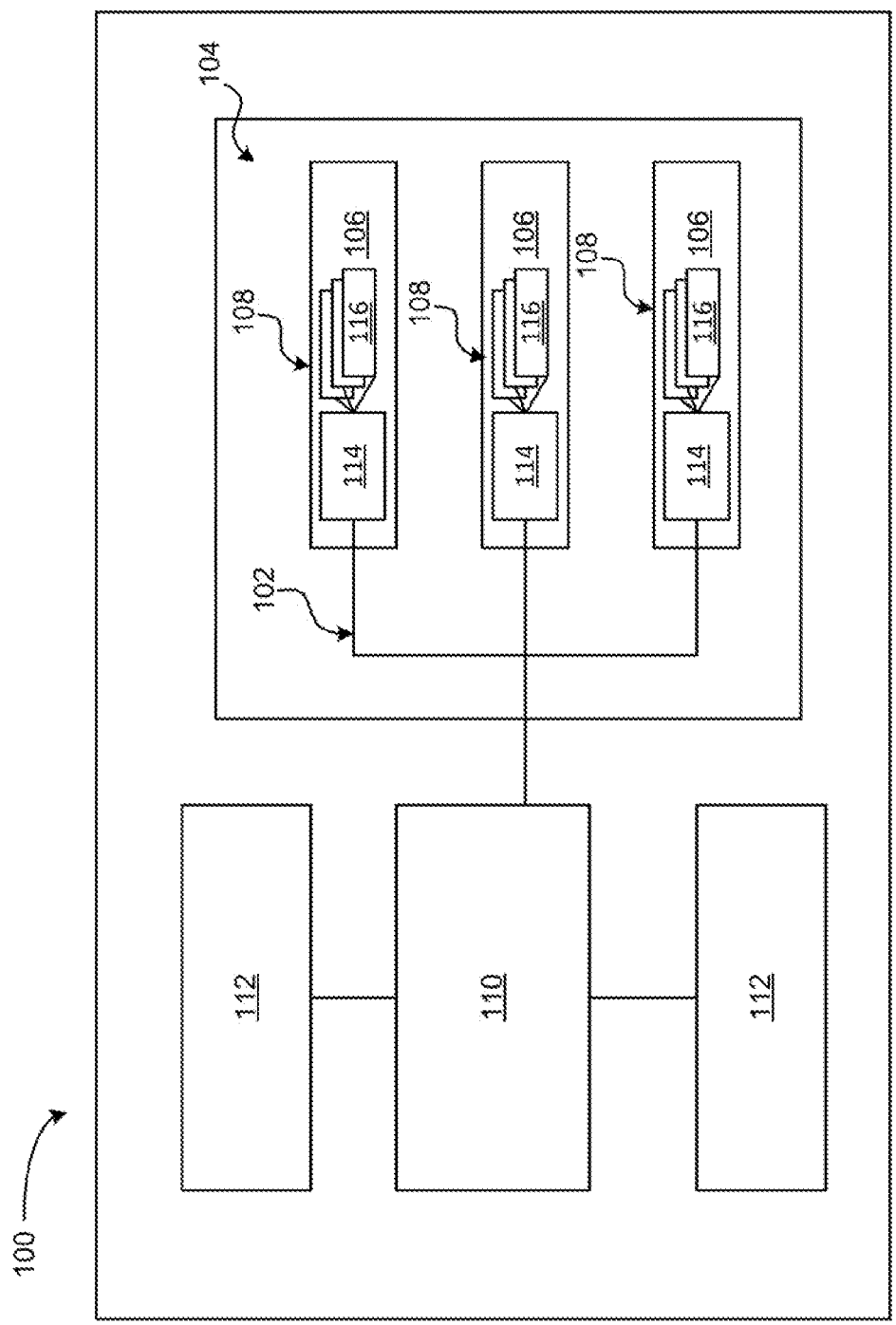
FIG. 1 illustrates a system in which a multi-battery pack is connected to supply power to a device.

In the following description, certain specific details are set forth in order to provide understanding of various embodiments of the disclosure. However, one skilled in the art will understand that the disclosure may be practiced without these details. Moreover, while various embodiments of the disclosure are disclosed herein, many adaptations and modifications may be made within the scope of the disclosure in accordance with the common general knowledge of those skilled in this art. Such modifications include the substitution of known equivalents for any aspect of the disclosure in order to achieve the same result in substantially the same way.

Multi-battery systems (also referred to as "multi-battery packs," "battery pack," or "battery compartments") generally include multiple battery cores in a battery and are commonly used in electric devices. In an ideal situation, all batteries in a multi-battery system have the same voltage and charge to ensure uniform performance, such as during charging and discharging. However, from time to time, different batteries in a multi-battery system may start to differ upon some uses, or even right after being manufactured. It is observed herein that when batteries of different voltages are connected in parallel, a battery with a higher voltage tends to charge a lower-voltage battery at a large current. Such undesired intra-system charging poses a safety risk and can damage the electric core of the batteries.

In some multi-battery implementations, each battery has a separate power switch. Even in such a configuration, however, when the batteries are switched on and then integrated into the system, there can be an instant large current surge which can cause damage to the circuit.

According to one embodiment of the present disclosure, the conducting state of a battery (e.g., power-on and power-off) is controlled by a battery management system (BMS). A BMS as used herein generally refers to a system that includes a processor, a memory, and a communication channels to one or more battery core and one or more other components of a system. In one instance, the BMS is able to detect certain electric characteristics of the battery and transmit such electric characteristics to an external device. Non-limiting examples of the electric characteristics include voltage, state of charge (SOC), charging capacity, state of health (SOH), temperature, and/or internal resistance.

With the BMS, the operation of the batteries can be controlled or coordinated to achieve better safety. For instance, to avoid inter-battery charging, an external control unit (e.g., a processor in an UAV equipped with a battery pack) can be configured to receive and analyze the electric characteristics before deciding whether to turn on the batteries. If the voltage differences between some of the batteries are too high (e.g., higher than a threshold value), then the control unit sends an error message instead of a signal to instruct the BMS to turn on the batteries. In another example, a condition set by the control unit is that some or all of the batteries have certain level of state of charges. If the condition is not met, the control unit does not instruct the BMS to turn on the batteries.

Since the conducting state of the batteries, in some embodiments, is controlled by the BMS, there is no longer a need to include a physical switch on the batteries. In one embodiment, a switch can still be included with each battery. However, the switch is used to turn to a status indicator showing a status of the battery. The status can be qualitative or quantitative, such as the relative voltage, SOC or SOH of the battery.

Another safety mechanism, as seen in one of the embodiments, entails the use of an in-place signal which indicates whether the battery system is placed in a device for which the battery is supposed to supply power. Before the correct placement, the battery system is not allowed to output current that might cause damage unnecessarily.

The in-place signal can be used to prevent power-on of the battery to increase safety. In one embodiment, once the in-place signal indicates a correct placement of the battery pack in a corresponding device that uses power supplied by the battery pack, the BMS operates the batteries to supply a safety voltage from at least one of the batteries. A "safety voltage" as used herein refers to a voltage that is generally safe for the battery itself and for the device for which the battery supplies power to. It can then be readily appreciated that the level of a safety voltage depends on the battery, the device, components of the device, and the purpose of the use.

A safety voltage can be used for various purposes in the present technology. In some embodiments, the safety voltage is supplied to a control unit of the device which can function to inspect the battery system and other portions of the device. In this context, it is useful to note that another term, "operating voltage," is also used herein and refers to a voltage that is higher than the safety voltage and is sufficient for the device to carry out a designated function (e.g., flying). Like the safety voltage, the operating voltage also is a relative term and can depend on the battery, device and the designated function. Nevertheless, given the specific environment, the skilled artisan can readily determine suitable levels or ranges for a safety voltage and an operating voltage. In some instances, the safety voltage and operating voltage are also referred to as "low voltage" and "high voltage" respectively.

In some embodiments, a battery that is able to output a safety voltage and an operating voltage has a single electrode (or pair of electrodes) for the output. In some embodiments, a battery that is able to output a safety voltage and an operating voltage uses different electrodes (or pairs of electrodes) for the different output. In some embodiments, a multi-battery pack includes just one battery that is able to output both a safety voltage and an operating voltage. In some embodiments, a multi-battery pack includes two or more batteries that is able to output both a safety voltage and an operating voltage. In some embodiments, only one of the two or more batteries is configured to output a safety voltage at a time. The battery that is configured to output the safety voltage is sometime referred to as a "primary battery" in the pack. A primary battery may be a designated battery for an entire operation or for the battery at all times. In another implementation, the primary battery designation can change between batteries.

In one of the above example embodiments, an in-place signal can trigger the output of a safety voltage from a battery. In this example, the safety voltage is on as soon as the battery pack is in place. In another example, the signal from the in-place sensor does not trigger the output of the safety voltage. Instead, the safety voltage is triggered when a power switch on the device is turned on, or when another type of power-on signal is generated from the device.

The supply of the safety voltage to the device, in particular to the control unit of the device, can be useful for management and use of the battery pack. Normally, the operation of the control unit requires lower voltage than the device in general. The use of the safety voltage, therefore, is sufficient for this purpose and is safe. Once the control unit is powered, it can communicate with the BMS in the battery pack. The communication can include transmission of electric characteristics of the batteries, and command to have the batteries to supply power at the operating voltages, for instance.

In some of the above embodiments, both the power switch and the control unit of device can communicate with the BMS. In one embodiment, these two lines of communication share a connection pathway. It is contemplated by the instant inventors, however, that sharing of the connections may lead to miscommunication. For instance, when the battery pack is placed in the device, given the unstable connection in the beginning, a false signal may be generated which may appear like a power-on signal from the power switch.

In accordance with one embodiment of the present disclosure, therefore, a separator is included in the battery between the battery cores and the BMS. The separator may include one or more pairs of transistor symmetrically/inversely placed. Such transistors may be useful for preventing the generation or transmission of such false signals but do not impact the transmission of normal communication.

In some instances, one or more batteries of a battery pack may malfunction. For instance, in some embodiments, each battery can self-report its charge. The report may be generated and transmitted by the BMS. If the BMS malfunctions or if the communication pathway for such reporting malfunctions, the affected battery can no longer report the charge. This may create issues for the control unit which relies on such information for decision-making. In one embodiment, therefore, systems and methods are provided to estimate the charge of the battery pack. The estimation may take as input the charges of the properly functioning batteries and/or other electric characteristics detected for the malfunctioning batteries.

Each of the above embodiments of the present disclosure is described in more detail with reference to the appended figures.

FIG. 1 illustrates a simplified schematic of a system 100 that includes multiple batteries, a control unit and certain movable parts of the system, according to one exemplary embodiment. It is important to note that the system 100 of FIG. 1 may be implemented in combination with other features, systems, and/or other methods described herein, such as those described with reference to other embodiments/aspects. Moreover, the system 100 may be used in various applications and/or in permutations, which may or may not be noted in the illustrative embodiments/aspects described herein. For instance, the system 100 may include more or less features/components than those shown in FIG. 1, in some embodiments.

In one embodiment, the aforementioned system includes a device that is a movable object powered by a battery pack. A movable object as provided herein may be configured to move in any suitable environment, such as air, water, on ground, in space, combinations thereof. For instance, the movable object may be an aerial vehicle (e.g., fixed-wing aircrafts such as airplanes, gliders, etc.; rotary-wing aircrafts such as helicopters, rotorcraft, etc.; aircrafts with both fixed-wings and rotary wings, and aircrafts having neither fixed nor rotary wings such as blimps, hot air balloons, etc.), a ground vehicle (e.g., car, truck, bus, van, train, motorcycle, etc.), a water vehicle (e.g., ship, submarine, etc.), a space vehicle (e.g., a space aircraft, satellite, probe, etc.), or combinations thereof.

In one particular embodiment, the movable object is an unmanned aerial vehicle (UAV). A UAV may not include an occupant onboard the vehicle, and may be controlled by a human, an autonomous control system (e.g., comprising a computer system), or a combination thereof.

As shown in FIG. 1, the system 100 includes various components (e.g., at least one battery, at least one switch, at least one battery management system, at least one control unit, etc.) operatively coupled via a power supply circuit 102. The various components may be operatively coupled via one or more wired pathways and/or one or more wireless pathways. Wired pathways may receive and/or transmit information via cables, wires, etc. Wireless pathways may receive and/or transmit information utilizing local area networks (LAN), wide area networks (WAN), infrared, radio, WiFi, point-to-point (P2P) networks, telecommunication networks, cloud communication, combinations thereof, etc.

As shown in FIG. 1, the system 100 includes a battery pack 104 configured to supply current and/or communicate via the power supply circuit 102. The battery pack 104 may include one or more (e.g., 1, 2, 3, 4, 5, 6, 7, etc.) batteries. In the particular embodiment of FIG. 1, the battery pack 104 is shown as comprising three batteries 106. Each battery 106 may include one or more battery cores or cells (116) each electrically connected to a battery management system 114. In one embodiment, at least one of the battery cells may be an electrochemical cell. In some embodiments, the battery cells may be connected in series, in parallel, or any combination thereof.

Exemplary batteries 106 may include, but are not limited to, lead acid batteries, valve regulated lead acid batteries (e.g., gel batteries, absorbed glass mat batteries), nickel cadmium batteries, nickel-zinc batteries, nickel metal hydride batteries, lithium polymer batteries, lithium ion batteries, and/or other suitable batteries as would be apparent to one skilled in the art upon reading the present disclosure. In one embodiment, at least two, a majority, substantially all, or all of the batteries 106 may be the same type of battery. In another embodiment, two or more of the batteries 106 are of a different type from one another.

In one embodiment, a single housing may enclose/encompass each of the batteries 106. Alternatively, the batteries 106 may each independently comprise a housing 108, in one embodiment. For instance, with reference to FIG. 1, a first set of the batteries 106 (top) may include a first housing 108, a second set of the batteries 106 (middle) may include a second housing 108, and third set of the batteries 106 (bottom) may include a third housing 108. Each of the housings 108 may enclose/encompass at least a portion, a majority, substantially all, or all of the particular battery associated therewith. In one embodiment, at least two, a majority, substantially all, or all of the housings 108 may be of the same material and/or the same dimensions as one another. In another embodiment, two or more of the housings 108 are of a different material and/or have different dimensions from one another.

In one embodiment, any of the aforementioned housings 108 may be physically coupled to the device. For instance, in one such embodiment, the housing(s) 108 may be partially or completely inserted into a battery compartment of the device. In some embodiments, the housing(s) 108 may not be visible/exposed after insertion into the device. In other embodiments, at least a portion of the housing(s) 108 may remain visible/exposed after insertion into the device.

At least one of the batteries 106 may be configured to power the control unit 110 of the system 100 by supplying a safety voltage thereto. In one embodiment, the safety voltage may be in a range from about 3.3 V to about 17.8 V. In one embodiment, the safety voltage is from about 3.3 V to about 17.8 V, from about 3.3 V to about 15 V, from about 3.3 V to about 13 V, from about 3.3 V to about 11 V, from about 3.3 V to about 9 V, from about 3.3 V to about 7 V, from about 3.3 V to about 5 V, from about 5 V to about 17 V, from about 5 V to about 15 V, from about 5 V to about 13 V, from about 5 V to about 11 V, from about 5 V to about 9 V, from about 5 V to about 7 V, from about 7 V to about 17 V, from about 7 V to about 15 V, from about 7 V to about 13 V, from about 75 V to about 11 V, from about 7 V to about 9 V, from about 9 V to about 17 V, from about 9 V to about 15 V, from about 9 V to about 13 V, from about 9 V to about 11 V, from about 11 V to about 17 V, from about 11 V to about 15 V, from about 11 V to about 13 V, from about 13 V to about 17 V, from about 13 V to about 15 V, or from about 15 V to about 17 V. In one embodiment, the operating voltage is about 3 V, about 4 V, about 5 V, about 6 V, about 7 V, about 8 V, about 9 V, about 10 V, about 11 V, about 12 V, about 13 V, about 14 V, about 15 V, about 16 V, or about 17 V.

When the battery 106 is capable of providing, and/or is providing, the safety voltage to the control unit 110, the battery 106 is considered to be in a power-on safety state (or simply "safety state"). Conversely, when the battery 106 is not capable of, and/or is prevented from, providing the safety voltage to the control unit 110, the battery 106 is considered to be in a power-off state. In some embodiments, the battery 106 must be physically connected to the device to be in the power-on state.

In one embodiment, the system 100 may include one or more optional in-place (proximity) sensors (not shown in FIG. 1) configured to determine/detect whether the batteries 106 are connected to the device. In one embodiment, a separate in-place sensor may be provided at each location where a battery 106 connects to the device. In some embodiments, one such in-plane sensor may detect when a battery 106 is physically connected to the device, and send an in-place signal to the battery 106, e.g., via the battery management system 114 operatively coupled thereto, in response to determining that the battery 106 is physically connected to the device. In another embodiment, no in-place sensors are needed, but the system can alternatively determine whether the battery pack is connected to the device. In one example, when the battery pack is connected to the device, pins on the battery pack and the device get in touch and complete a circuit which signals that they are connected.

In one embodiment, at least one of the batteries 106 may be configured to automatically supply a safety voltage to the control unit 110 in response to being physically connected to the device. In such embodiments, the safety voltage output of the at least one battery 106 is in an always-on state. In an additional embodiment, at least one of the batteries 106 may be configured to automatically supply a safety voltage to the control unit 110 in response to being physically connected to the device and receiving an in-place signal.

In another embodiment, at least one of the batteries 106 may not be configured to automatically supply a safety voltage to the control unit 110 in response to being physically connected to the device. Rather, the at least one battery 106 may be configured to supply a safety voltage to the control unit 110 in instances where the BMS 114 operatively coupled to the battery 106 receives a signal from a power input element (not shown in FIG. 1). This power input element may be configured to control a power-on or a power-off state of the device, and particularly the control unit 110 thereof. Activation of the power input element may send a signal to the BMS 114, thereby prompting the BMS 114 to cause the battery operatively coupled thereto to supply the safety voltage to the control unit 110 (e.g., via operation of an electronic switch).

In some embodiments, the aforementioned power input element may be a button switch, a mechanical switch, a potentiometer, or a sensor. The power input element may be activated directly by a user, e.g., by the user manually interacting with the power input element (e.g., pressing a button, flipping a switch, turning a knob or dial, touching a touch interface, speaking into a microphone, etc.).

With continued reference to FIG. 1, one of the batteries 106 may be designated as the primary battery in one embodiment. In some embodiments, the primary battery is the battery configured to at least power the control unit 110 by supplying the safety voltage thereto.

In one embodiment, each of the batteries 106 may be individually configured to supply a safety voltage to the control unit 110. Embodiments in which each of the batteries 106 is capable of supplying a safety voltage to the control unit 110 are advantageous, as the control unit 110 can select which of the batteries 106 is to be designated the primary battery.

In some embodiments, each battery 106 may be coupled to a device via a first pathway and a second pathway. Each battery 106 may supply the safety voltage to a control unit in the device via the first pathway, and supply the operating voltage via the second pathway. In one embodiment, the first pathway may comprise a wired pathway such as a cable, wire, electrical line, etc. In one embodiment, the second pathway may comprise a wireless pathway and/or a wired pathway (e.g., a cable, wire, electrical line, etc). The separate pathways, in some embodiments, include the use of separate pins, or more generally separate connecting terminals, both at the battery pack and at the device for connecting the battery pack and the device. For instance, the terminals can include one or more operating voltage terminals to apply an operating voltage, one or more safety voltage terminals to apply a safety voltage, and one or more communication terminals to allow the control unit to communicate with the battery and control the supply of power.

In one embodiment, each of the batteries 106 may be configured to self-report its respective charge (or voltage) to the control unit 110, e.g., via the second (communication) pathway. Such self-reporting can be carried out by the BMS 114. However, in some instances, there may be an error (e.g., a communication breakdown) that prevents a battery 106 from being able to self-report its charge to the control unit 110, e.g., via the second pathway. Accordingly, in some embodiments, the control unit 110 may be configured to estimate the charge of the batteries 106. For instance, in one such embodiment, the control unit 110 may be configured to determine the amount of charge of a battery 106 based on the information provided in the first pathway, where the information corresponds to the voltage output from the battery. The voltage output of the battery may then be compared to the total known capacity of the battery to yield an estimate of the state of charge thereof.

In addition to powering the control unit 110, each of the batteries 106 may be individually configured to power one or more components 112 of the device by supplying an operating voltage thereto. In one embodiment, the operating voltage may be in range from about 18 V to about 26.3 V. In one embodiment, the operating voltage is from about 18 V to about 26.3 V, from about 18 V to about 24 V, from about 18 V to about 22 V, from about 18 v to about 20 V, from about 20 V to about 26 V, from about 20 V to about 24 V, from about 22 V to about 26 V, from about 22 V to about 24 V, or from about 24 V to about 26 V. In one embodiment, the operating voltage is about 18 V, about 19 V, about 20 V, about 21 V, about 22 V, about 23 V, about 24 V, about 25 V, or about 26 V.

When a battery 106 is providing the operating voltage to the one or more components 112 of the device, the battery 106 is considered to be in a conducting-on state (or "operating state"). Conversely, when the battery 106 is not capable of, and/or is prevented from, providing the operating voltage to the one or more components 112 of the device, the battery 106 is considered to be in a conducting-off state (or "non-operating state"). In one embodiment, each of the batteries 106 may be operatively coupled to the one or more components 112 and thus able to directly supply the operating voltage thereto. In one embodiment, each of the batteries 106 may supply the operating voltage to the one or more components 112 via the control unit 110.

In one embodiment, at least one of the components 112 may be a propulsion unit configured to provide a driving force to the device. The driving force from the propulsion unit may provide lift to the device, thereby enabling it to fly, as well as enable the device to land on a surface, maintain a current position and/or orientation (hover), change position and/or orientation, etc. The propulsion unit may include one or more of rotors, propellers, blades, engines, motors, wheels, axles, magnets, nozzles etc. In one embodiment, the device may include one or more (e.g., 1, 2, 3, 4, 5, 6, etc.) propulsion units. In embodiments in which at least two propulsion units are present, each of the propulsion units may be the same type, or, alternatively, one or more of the propulsions units may be of a different type. In one embodiment in which at least two propulsion units are present, each of the propulsion units may be controlled and powered independently of the other propulsion units. However, in another embodiment in which at least two propulsion units are presents, each of propulsion units may be controlled and powered simultaneously. The propulsion unit(s) may be physically mounted to any suitable portion of the device using any suitable means such as a support element (e.g., a drive shaft). In some embodiments, the components 112 can also include a payload, a carrier, a sensor, a communication unit, a processor, an I/O device, or any other component that requires electricity to operate.

While not shown in FIG. 1, the system 100 may include one or more indicator devices configured to display a general status of one or more of the batteries 106. In one embodiment, a separate indicator device may be provided for each battery 106, and configured to display a general status thereof. The general status of each battery 106 may include the current amount of charge thereof, a percentage of the state of charge thereof (e.g., as calculated by dividing the current/state of charge of the battery 106 by the total charge of the battery 106), the continuous time of use remaining thereof (e.g., the length of time the battery 106 can continue discharging at its current discharge rate), etc. In one exemplary embodiment, the general status of the battery 106 includes at least the current amount of charge of the battery 106.

In one embodiment, the indicator device may be a graphical indicator configured to graphically display the amount of charge of the battery 106 operatively coupled thereto. The amount of charge of the battery 106 may be graphically displayed using bar graphs, levels, line graphs, icons, etc.

In one embodiment, the indicator device may be a numerical indicator configured to display a numerical value indicative of the amount of charge of the battery 106 operatively coupled thereto. For instance, in one such embodiment, the numerical indicator may display "50%" when the battery 106 has 50% charge remaining, "65%" when the battery 106 has 65% charge remaining, etc. In another such embodiment, the numerical indicator may display a range, e.g., "25%-50%, when the state of charge of the battery 106 falls within the range.

In one embodiment, the indicator device may include at least one light source (e.g., a light emitting diode (LED)) having a light output characteristic indicative of the amount of charge of the battery 106 operatively coupled thereto, where the light output characteristic may include a predetermined output color associated with an amount of charge, a predetermined intensity associated with an amount of charge, etc. For instance, in one such embodiment, the light source may output a first color when the battery 106 has 0% to 25% charge remaining, a second color when the battery 106 has greater than 25% to 50% charge remaining, a third color when the battery 106 has greater than 50% to 75% charge, and a fourth color when the battery 106 has greater than 75% to 100% charge remaining. Similarly, the light source may output a first intensity of light when the battery 106 has 0% to 25% charge remaining, a second intensity of light when the battery 106 has greater than 25% to 50% charge remaining, a third intensity of light when the battery 106 has greater than 50% to 75% charge, and a fourth intensity of light color when the battery 106 has greater than 75% to 100% charge remaining.

In one embodiment, the indicator device may include a plurality of light sources (e.g., LEDs), wherein the amount of charge of the battery 106 operatively coupled thereto is indicated by the number of light sources that simultaneously emit light. For instance, in one embodiment, the indicator device may include five light sources, where 1 emitting light emitting light indicates 0 to 20% state of charge, 2 emitting lights indicates greater than 20% to 40% charge, 3 emitting light indicates greater than 40% charge to 60% charge, 4 emitting light indicates greater than 60% to 80% charge, and 5 emitting light indicates greater than 80% to 100% charge. Any number of light sources may be provided, which may determine the precision of the percentage ranges that can be used to indicate the state of charge of the battery 106.

It is important to note that the aforementioned ranges of charge indicated by the indicator device are not limiting in any way, and may be set to any suitable range (e.g., ranges covering increments of 2, 5, 10, 15, 20, 25, 30, 50, etc.).

In one embodiment, the indicator device of each battery 106 may be positioned on an external surface of the device (e.g., a UAV).

In one embodiment, the indicator device of each battery 106 may be positioned on an external surface of the housing 108 of its respective battery 106. This external surface of the housing 108 may remain visible/exposed to a user of the device (e.g., a UAV) such that the user can observe the general status of the battery 106. In one embodiment, the indicator device may indicate the general status of the battery 106 to which it is operatively coupled when the battery 106 is physically connected to the device. In one embodiment, the indicator device may indicate the general status of the battery 106 to which it is operatively coupled even when the battery 106 is not physically connected to the device.

While also not shown in FIG. 1, the system 100 may include an optional power measurement device operatively coupled to each of the batteries 106. The power measurement device may be configured to calculate the charge of the batteries 106. For instance, in one embodiment, the power measurement device may include, for each battery 106, a voltage sensing device (e.g., a resistor) configured to collect/sample the voltage of the respective battery 106 during discharge thereof. The power measurement device may thus be configured to obtain, for each battery 106, the collected/sampled voltage by the voltage sensing device, calculate the current from the collected/sampled voltage, and calculate the state of charge of the battery 106 using integration. In one embodiment, the voltage sensing device may be positioned between its respective battery 106 and a switch configured to control one or more conducting states of the battery 106.

In an alternative embodiment, the control unit 110 and/or BMS 114 of FIG. 1 may be configured to calculate the current charge of each battery 106 in lieu of, or in addition to, the optional power measurement device. For instance, in one such embodiment, the control unit 110 and/or BMS 114 may be coupled to the voltage sensing device, and configured to obtain, for each battery 106, the collected/sampled voltage by the voltage sensing device, calculate the current from the collected/sampled voltage, and calculate the state of charge of the battery 106 using integration.

In some embodiments, the optional power measurement device, the control unit 110, and/or BMS 114 may be configured to covert analog signals to digital signals (e.g., via an analog to digital converter unit) to thereby obtain the voltage collected/sampled by the aforementioned voltage sensing device, and calculate the current according to Ohm's law (i.e., I=V/R, where I represents current, V represents voltage, and R represents resistance. The optional power measurement device and/or the control unit 110 may further be configured to determine charge from the calculated current according to the formula Q=I*t, wherein Q represents charge, I represents the current, and t represents time. The power measurement device, the control unit 110 and/or the BMS 114 may be configured to obtain a signal (e.g., corresponding to the voltage collected/sampled during discharge of the battery 106) from the voltage sensing device at predetermined intervals, such as once every t. The current charge (Qc) associated with a battery 106 may be calculated according to the formula: $Q_c=Q_0+Q_1$, where $Q_0$ is the initial charge of the battery 106, and $Q_1$ is the change in charge during the charge/discharge of the battery 106 ($Q_1=\Sigma I*t$). The percentage of the current charge of the battery 106 may therefore be calculated by dividing the current charge, $Q_c$, by the total charge capacity of the battery 106.

As noted previously, a separate indicator device may be operatively coupled to each battery 106 showing the status of the battery. In one embodiment, each indicator device may also be operatively coupled to the power supply circuit 102, the control unit 110, and/or the optional power measurement device.

In one embodiment, the system 100 may include a separate indicator input element (not shown in FIG. 1) for each indicator device. Each separate indicator input element may be operatively coupled to its respective indicator device and configured to control a power-on state or a power-off state thereof. The power-on state of an indicator device corresponds to a state in which the indicator device is currently indicating the general status of its respective battery 106, whereas the power-off state of the indicator device corresponds to a state in which the indicator device is not indicating the general status of its respective battery 106. For instance, activation of the indicator input element, e.g., by a user, may send a signal to the indicator device to display the current charge of the battery 106 operatively coupled to the indicator device. Such activation of the indicator input element, however, does not cause the battery to be in a power-on state in which the battery is capable of providing current to the device, and particularly the control unit thereof, or cause the battery to actively supply any voltage to the device.

In some embodiments, the indicator input element may be a button switch, a mechanical switch, a key switch, a potentiometer, a sensor, and combinations thereof. In one embodiment, the indicator input element may be a sensor selected from the group consisting of: a pressure sensor, a barometric pressure sensor, a proximity sensor, an electrostatic sensor, a capacitive touch sensor, and combinations thereof. In one embodiment, the indicator input element may be activated directly by a user, e.g., by the user manually interacting with the power input element (e.g., pressing a button, flipping a switch, turning a knob or dial, touching a touch interface, speaking into a microphone, etc.). In some embodiments, the indicate input element is remotely activated, such as via a remote control device.

As indicated previously, the system 100 may include one or more electronic switches for controlling the voltage output (i.e., the safety/low and operating/high voltage output) of the battery. These switches may be operatively coupled to the power supply circuit 102 and the power supply 104. For instance, each of the batteries 106 may be operatively coupled to at least one switch for controlling the power and/or conducting state thereof. Such electronic switches may utilize solid state electronics to control charge and discharge of the battery coupled thereto. In one embodiment, the electronic switches have no moving parts and/or does not utilize an electromechanical device (e.g., as in conventional relays or switches with moving parts). The electronic switches may each optionally have a binary state (e.g., they may be in a switched-on state or a switched-off state). The electronic switches may comprise field effect transistors, a solid state relay, a power transistor, an insulated gate bipolar transistor, or other suitable switches as would be apparent to skilled artisans upon reading the present disclosure. For each battery 106, at least one electronic switch for controlling operation thereof may be located between the battery 106 and the control unit 110. In some embodiments, the electronic switches may be operated/controlled by the control unit 110 and/or the BMS 114.

As also indicated previously, and as shown in FIG. 1, the power supply circuit 102 includes a battery management system (BMS) 114. In one embodiment, each of the batteries 106 may be independently coupled to a separate BMS 114. Alternatively, each of the batteries 106 may be coupled to the same BMS 114, in one embodiment.

The BMS 114 may be configured to communicate with the control unit 110. For instance, in one embodiment, the BMS 114 may be configured to transmit one or more electrical characteristics associated with each battery 106 to the control unit 110. The one or more electrical characteristics associated with each battery 106 may include the general status of each battery, the state of charge of each battery, the continuous time of use remaining of each battery, etc. It is of note, however, that the control unit 110 may be configured to obtain/receive the one or more characteristics associated with each battery 106 from the BMS 114, a voltage sensing device as disclosed herein, and/or an optional power measurement device as disclosed herein.

The BMS 114 may also be configured to receive one or more controlling signals from the control unit 110. The controlling signals may designate a desired conducting state for each battery 106 based on the one or more electrical characteristics thereof. The BMS 114 may be configured to control the conducting state of each battery 106 based on the controlling signals. For instance, the BMS 114 may receive, for a particular battery 106, a first controlling signal from the control unit 110 designating a conducting-on state of the particular battery 106. In response to receiving this first controlling signal, the BMS 114 may then cause the particular battery 106 to be in the conducting-on state, e.g., by operating an electrical switch operatively coupled to the battery 106 and the BMS 114, where the battery 106 in the conducting-on state supplies an operating voltage to one or more components 112 of the device. Alternatively, the BMS 114 may receive, for a particular battery 106, a second controlling signal from the control unit 110 designating a conducting-off state of the particular battery 106. In receiving this second controlling signal, the BMS 114 may then cause the particular battery 106 to be in the conducting-off state by operating the aforementioned electronic switch, where the battery 106 in the conducting-off state is unable to, or prevented from, supplying the operating voltage to the one or more components 112 of the device.

As discussed previously, and as shown in FIG. 1, the power supply circuit 102 includes the control unit 110. The control unit 110 may be configured to communicate with each battery 106, e.g. via the BMS 114.

The control unit 110 may also be configured to obtain one or more electrical characteristics associated with each battery, and send a controlling signal to each battery (e.g., via the BMS 114) to control the battery's conducting state (e.g., a conducting-on, a safety voltage, or a conducting-off state) based on the one or more electrical characteristics thereof. In one embodiment, the controlling signal may either be a first controlling signal designating a conducting-on state of a battery, or a second controlling signal designating a conducting-off state of the battery. Such a configuration in which the control unit 110 is configured to send controlling signals to control the specific conducting states of the battery based on the electrical characteristics thereof is useful in preventing a high charge battery from charging a low charge battery which poses a safety risk and/or risks damaging the electrical components of the device.

In one embodiment, the control unit 110 may be further configured to determine, for each battery 106, whether the one or more electrical characteristics associated therewith satisfy a predetermined condition prior to sending the controlling signals. In some embodiments, determining whether the one or more electrical characteristics of a particular battery 106 satisfies a predetermined condition may involve: determining the battery with the highest voltage; calculating the voltage difference between the battery 106 with the highest voltage and the voltage of the particular battery 106; and determining whether the voltage difference is below a predetermined voltage cut-off threshold. In such embodiments, the predetermined condition may thus be satisfied for the particular battery 106, at least in part, when the calculated voltage difference for the battery is below the predetermined voltage cut-off threshold.

In further embodiments, determining whether the one or more electrical characteristics of a particular battery 106 satisfies a predetermined condition may involve, in addition to calculating the voltage difference, determining whether charge of the particular battery 106 falls within a predetermined range. The predetermined condition may thus be satisfied for the particular battery 106, at least in part, when the charge associated with the battery is within the predetermined range.

In one embodiment, the control unit 110 may be configured to send a first controlling signal to each battery 106 that satisfies the predetermined condition (e.g., has a voltage difference below a predetermined voltage cut-off threshold and/or a charge within a predetermined range), where the first controlling signal designates a conducting-on state. In one embodiment, the control unit 110 may be configured to send a second controlling signal to each battery 106 that fails to satisfy the predetermined condition (e.g., has a voltage difference equal to or above the predetermined voltage cut-off threshold and/or a charge outside the predetermined range).

As an example only, consider the case in which the system 100 includes battery A, battery B and battery C having voltages of 7 V, 12 V and 15 V, respectively. Assume that the predetermined voltage cut-off threshold is set at 5 V. As the voltage difference between battery B and battery C (the battery having the highest voltage) is 3 V, which is below the predetermined voltage cut-off threshold of 5 V, the control unit 110 may send the first controlling signal (designating a conducting-on state) to battery B. In response to receiving the first controlling signal, the conducting-on state of battery B may be initialized/activated such that battery B supplies an operating voltage to one or more components 112 of the device. In contrast, as the voltage difference between battery A and battery C (the battery having the highest voltage) is 8 V, which is above the predetermined voltage cut-off threshold of 5 V, the control unit 110 may send the second controlling signal (designating a conducting-off state) to battery A. In response to receiving the second controlling signal, the conducting-off state of battery A may be initialized/activated such that battery A is unable to supply an operating voltage to one or more components 112 of the device. Yet in another example, in the event when the voltage difference between battery A and battery C is above the predetermined voltage cut-off threshold, battery C which has the lowest voltage can be turned off while keeping batteries A and B on. Accordingly, the largest difference between the highest voltage and the lowest one is reduced to be below the threshold.

The control unit 110 may be further configured to display an error message indicating each battery that fails to satisfy the predetermined condition. This error message may be displayed via an error indicator device (e.g., a display device such as a screen, a light source, etc.).

Figure 2A:
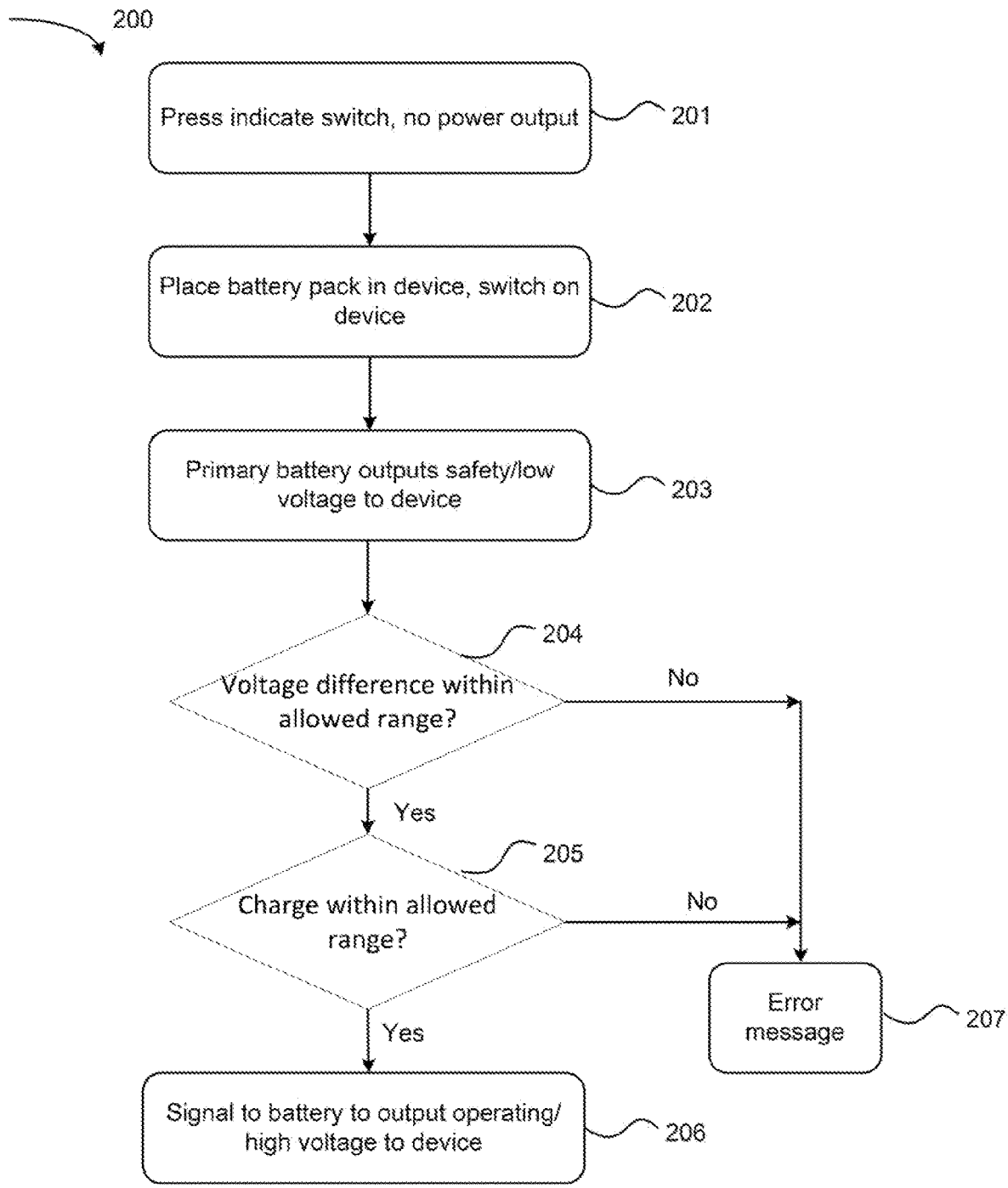
FIGS. 2A and 2B illustrate work flows for controlling the output of a battery pack to a device.
Figure 2B:
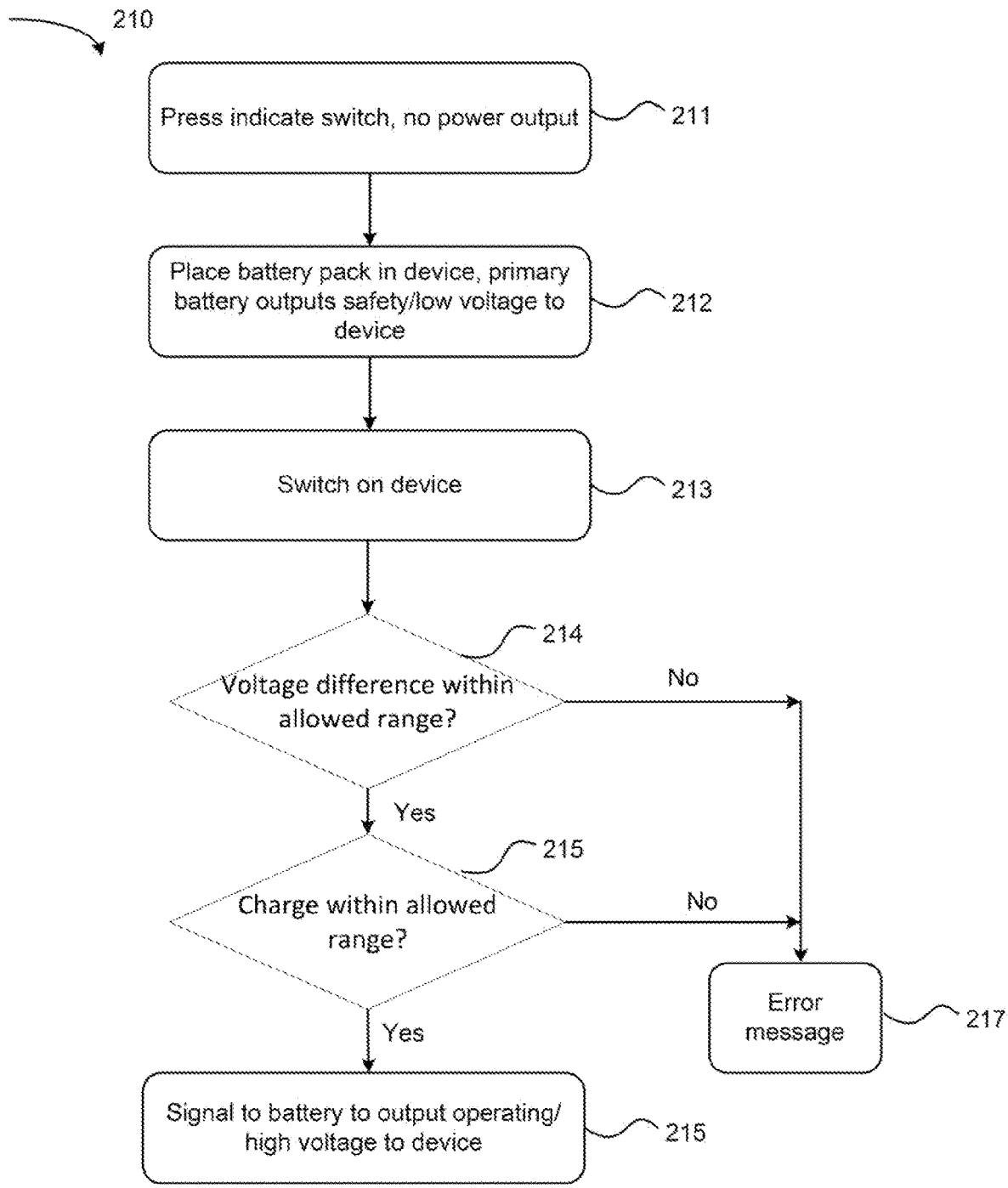

Two examples are illustrated in FIGS. 2A and 2B for controlling the power supply state of a battery pack. In FIG. 2A, the process 200 starts with the optional step 201, pressing one or more indicator switch on the battery pack. At this step, only an indication of charge or voltage is shown, and power is discharged from the batteries. Then, at step 202, the battery pack is placed in the device, and the power switch of the device is switched on, which triggers a battery (primary battery) of the battery pack to supply a safety/low voltage to the control unit of the device (203). The control unit, in communication with a BMS of each of the batteries, checks to see if the voltage difference is within an acceptable range (204), and whether each battery has a change that is within an acceptable range (205). If both conditions are met, then the control unit instructs the BMS to turn on the batteries which will supply an operating/high voltage to the device (206). Otherwise, an error message is transmitted/displayed and the battery pack does not supply the operating voltage to the device (207).

Alternatively, in FIG. 2B, even before the power switch is turned on at the device, the battery pack supplies (or is instructed by the BMS to supply) a safety/low voltage to the control unit as soon as the battery is placed in the device. Briefly, in FIG. 2B, the process 210 starts with the optional step 211, pressing one or more indicator switch on the battery pack. Then, at step 212, the battery pack is placed in the device, and thus the battery pack supplies a safety/low voltage to the control unit of the device (213). When the power switch of the device is switched on, the control unit, in communication with a BMS of each of the batteries, checks to see if the voltage difference is within an acceptable range (214), and whether each battery has a change that is within an acceptable range (215). If both conditions are met, then the control unit instructs the BMS to turn on the batteries which will supply an operating/high voltage to the device (216). Otherwise, an error message is transmitted/displayed and the battery pack does not supply the operating voltage to the device (217). Nevertheless, it is noted that any or all of methods disclosed here for controlling the current supply of the batteries can be used to control the current supply of individual battery cores, or groups of batteries.

In one embodiment, the power supply circuit 102 may also include at least one separator device (not shown in FIG. 1) between each battery 106 and the control unit 110. Such a configuration may be advantageous in preventing a large current surge to the power supply circuit 102 in embodiments where the batteries 106 have different voltages, the power switch of the device and the control unit of the device share the same pathway to the battery, and/or the batteries are prematurely discharged. For instance, in one such embodiment, a battery 106 may not be properly installed in the device, yet the control unit 110 nonetheless determines the battery to be properly installed (e.g., due to receiving an erroneous in-place signal from an in-place sensor, etc.). The control unit 110 may thus believe the battery to be in a power-on state, leading the control unit 110 to check and prematurely initialize the battery for supplying power to one or more components 112 of the device. The presence of at least one separator device between the battery 106 and the control unit 110 may therefor help prevent a current surge and damage to the one or more components 112.

Figure 3:
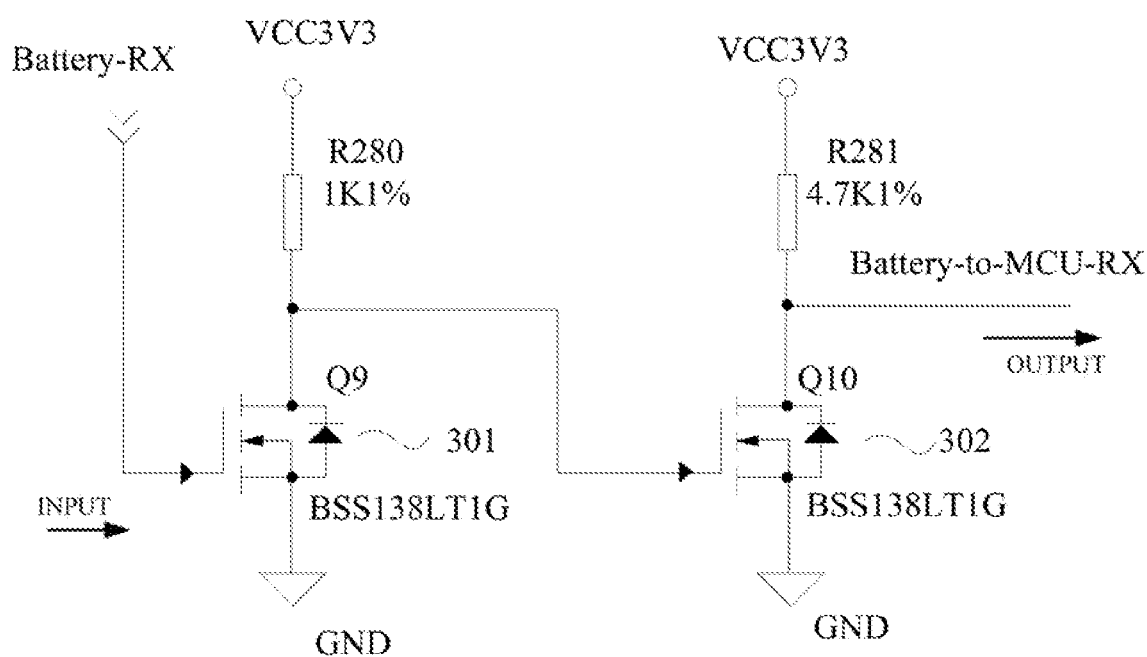
FIG. 3 shows a separator that can be placed between one or more batteries and a battery management system (BMS)

In some embodiments, there may be a separator that includes at least two (e.g., 2, 3, 4, 5, 6, 7, etc.) transistors present between each battery 106 and the control unit 110. In one embodiment, there may be from 2 to 4 transistors (such as transistors 301 and 302 in FIG. 3) present between each battery 106 and the control unit 110. The transistors can be connected in series; can be of the same type of different types, without limitation. In one embodiment, the transistors may include a MOSFET. In one embodiment, the separator devices may include an n-channel MOSFET comprising an insulating layer (e.g., a silicon dioxide insulating layer) having a high resistance. FIG. 3 illustrates an embodiment in which two n-channel MOSFETs (301 and 302) are located between one of the batteries 106 (BAT1_RX) and the control unit (CU) 110 (MCU_RX). Also noted in FIG. 3 are power supply pins (VCC3V3) and grounds (GND) associated with the MOSFETs.

Figures 4A, 4B:
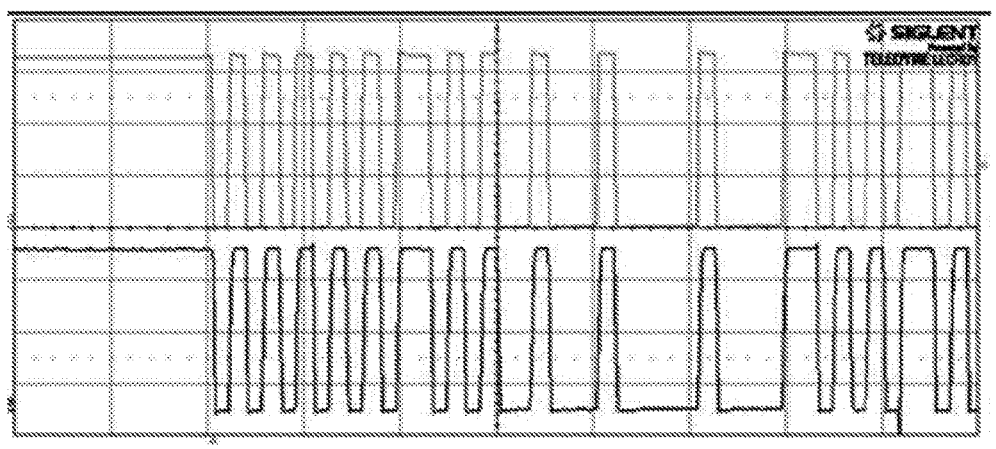
FIG. 4A illustrates exemplary signal output of a battery with a separator between the battery and a control unit.
FIG. 4B illustrates exemplary signal input to a control unit with a separator between the control unit and a battery.

The presence of the separator device(s) between each battery 106 and the control unit 110 does not impact the signals (e.g., communication and/or safety voltage signals) transmitted therebetween. For instance, FIGS. 4A-4B illustrate an embodiment in which two n-channel MOSFETs are present between a battery 106 and the control unit 110, where the signal output of the battery 106 (FIG. 4A) is substantially the same as the signal received at the control unit 110 (FIG. 4B).

As will be appreciated by skilled artisans, one or more aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," "unit" or "system." Moreover, aspects of the present disclosure may take the form of a computer program product embodied in any one or more computer readable medium(s) having computer usable program code embodied thereon.

For instance, in some embodiments, the control unit 110 disclosed herein, the BMS 114 disclosed herein, the power measurement device disclosed herein, etc. may each include at least one processor such as a programmable processor (e.g., a central processing unit (CPU)). In some embodiments, the control unit 110 disclosed herein, the BMS 114 disclosed herein, and/or the power measurement device disclosed herein may each be operatively coupled to a non-transitory computer readable medium that can store logic, code, and/or program instructions executable by the respective control unit 110, the BMS 114, and/or the power measurement device for performing one or more steps. The non-transitory computer readable medium can include one or more memory units (e.g., removable media or external storage such as an SD card or random access memory (RAM)).

Figure 5:
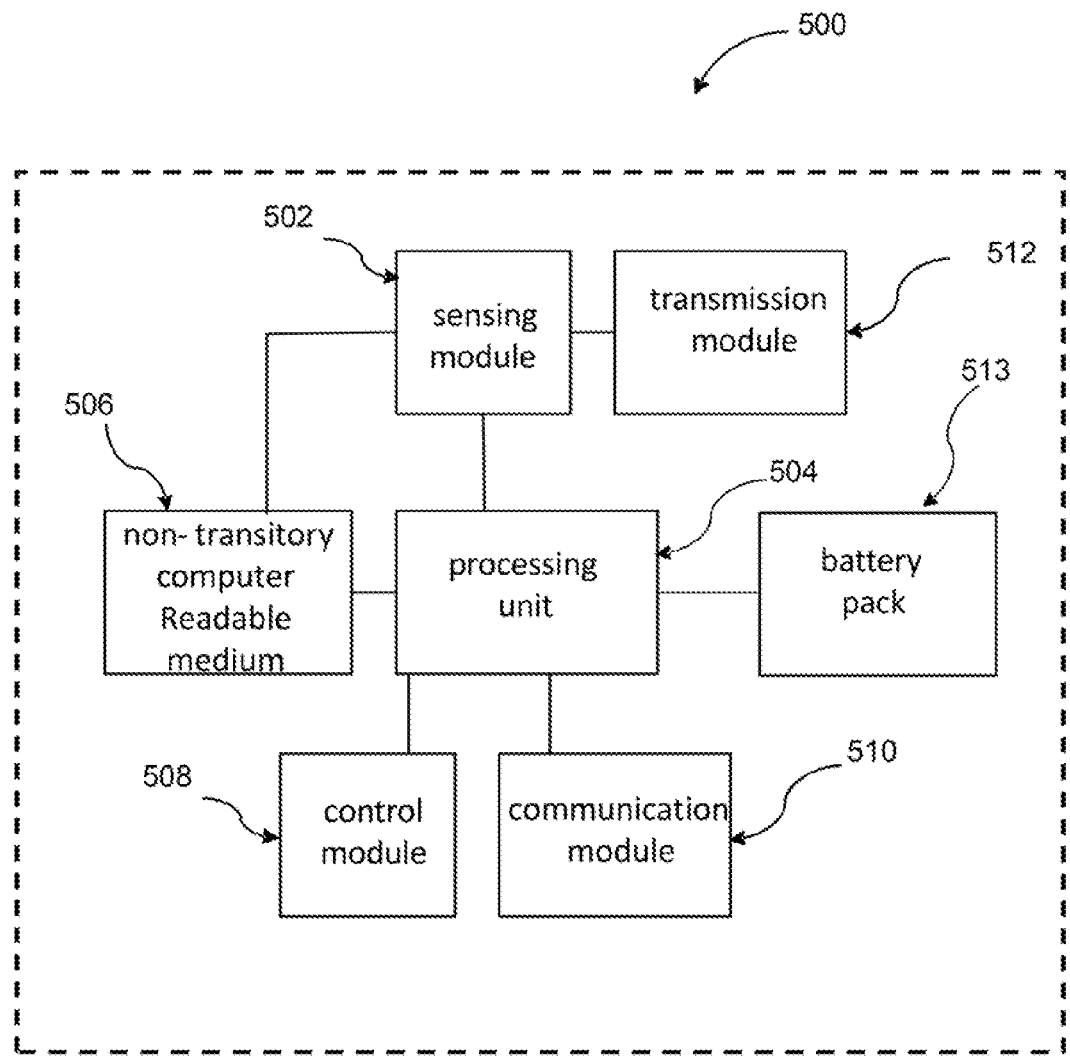
FIG. 5 illustrates the configuration a system that uses a battery pack of the disclosure to power a vehicle.

The device of the present disclosure, in some embodiments, may be part of a movable object (e.g., an UAV). As provided, the movable object may be a driverless car, a car with driving assistance functions, or an UAV. FIG. 5 is a schematic illustration by way of block diagram of a system 500 for controlling the aircraft/UAV, in accordance with some embodiments. The system 500 can be used in combination with any suitable embodiment of the systems, devices, and methods disclosed herein. The system 500 can include, in addition to a battery pack 513 which can be any battery pack of the present disclosure, a sensing module 502, processing unit 504, non-transitory computer readable medium 506, control module 508, and communication module 510.

The sensing module 502 can utilize different types of sensors that collect information relating to the aircrafts in different ways. Different types of sensors may sense different types of signals or signals from different sources. For example, the sensors can include inertial sensors, GPS sensors, proximity sensors (e.g., lidar), a radar unit, or vision/image sensors (e.g., a camera). The sensing module 502 can be operatively coupled to a processing unit 504 having a plurality of processors. In some embodiments, the sensing module can be operatively coupled to a transmission module 512 (e.g., a Wi-Fi image transmission module) configured to directly transmit sensing data to a suitable external device or system. For example, the transmission module 512 can be used to transmit images captured by a camera of the sensing module 502 to a remote terminal.

The processing unit 504 can have one or more processors, such as a programmable processor (e.g., a central processing unit (CPU)). The processing unit 504 can be operatively coupled to a non-transitory computer readable medium 506. The non-transitory computer readable medium 506 can store logic, code, and/or program instructions executable by the processing unit 504 for performing one or more steps. The non-transitory computer readable medium can include one or more memory units (e.g., removable media or external storage such as an SD card or random access memory (RAM)). In some embodiments, data from the sensing module 502 can be directly conveyed to and stored within the memory units of the non-transitory computer readable medium 506. The memory units of the non-transitory computer readable medium 506 can store logic, code and/or program instructions executable by the processing unit 504 to perform any suitable embodiment of the methods described herein. For example, the processing unit 504 can be configured to execute instructions causing one or more processors of the processing unit 504 to analyze sensing data produced by the sensing module. The memory units can store sensing data from the sensing module to be processed by the processing unit 504. In some embodiments, the memory units of the non-transitory computer readable medium 506 can be used to store the processing results produced by the processing unit 504.

In some embodiments, the processing unit 504 can be operatively coupled to a control module 508 configured to control a state of the aircraft. For example, the control module 508 can be configured to control the propulsion mechanisms of the aircraft to adjust the spatial disposition, velocity, and/or acceleration of the aircraft with respect to six degrees of freedom. Alternatively or in combination, the control module 508 can control one or more of a state of a carrier, payload, or sensing module.

The processing unit 504 can be operatively coupled to a communication module 510 configured to transmit and/or receive data from one or more external devices (e.g., a terminal, display device, or other remote controller). Any suitable means of communication can be used, such as wired communication or wireless communication. For example, the communication module 510 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 510 can transmit and/or receive one or more of sensing data from the sensing module 502, processing results produced by the processing unit 504, predetermined control data, user commands from a terminal or remote controller, and the like.

The components of the system 500 can be arranged in any suitable configuration. For example, one or more of the components of the system 500 can be located on the aircraft, carrier, payload, terminal, sensing system, or an additional external device in communication with one or more of the above. Additionally, although FIG. 5 depicts a single processing unit 504 and a single non-transitory computer readable medium 506, one of skill in the art would appreciate that this is not intended to be limiting, and that the system 500 can include a plurality of processing units and/or non-transitory computer readable media. In some embodiments, one or more of the plurality of processing units and/or non-transitory computer readable media can be situated at different locations, such as on the aircraft, carrier, payload, terminal, sensing module, additional external device in communication with one or more of the above, or suitable combinations thereof, such that any suitable aspect of the processing and/or memory functions performed by the system can occur at one or more of the aforementioned locations.

Certain embodiments of the present disclosure are described below with reference to flowchart illustrations and/or block diagrams of methods. It is understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus, where such instruction when read and/or executed by the processor of a computer or other programmable data processing apparatus create means for implementing the functions/steps specified in the flowchart and/or block diagrams.

Figure 6:
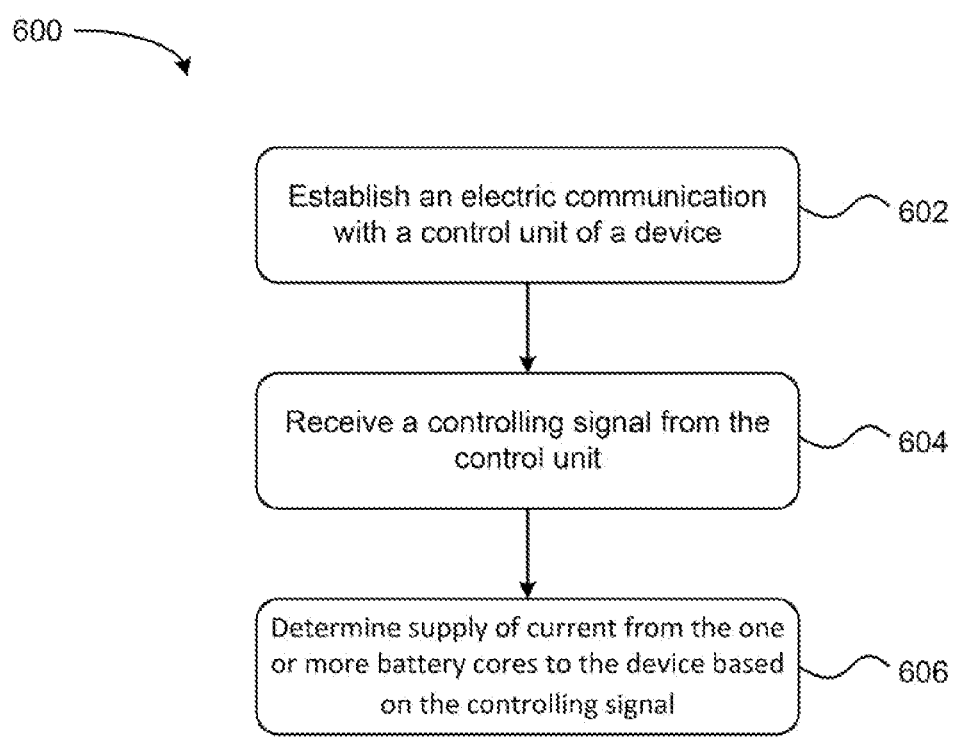
FIG. 6 presents a flowchart of a method of one embodiment of the present disclosure.

Referring now to FIG. 6, a flowchart of a power supplying method 600 for a battery is shown according to one embodiment. The method 600 may be implemented in combination with other features, systems, and/or other methods described herein, such as those described with reference to other embodiments/aspects. Moreover, the method 600 may be used in various applications and/or in permutations, which may or may not be noted in the illustrative embodiments/aspects described herein. For instance, the method 600 may be carried out in any desired environment, and may include more or less steps than those described and/or illustrated in FIG. 6.

In one embodiment, the method 600 may be implemented in/by a system similar and/or substantially the same as system 100 of FIG. 1. For instance, the method 600 may be implemented in/by a system comprising at least one battery operatively coupled to a control unit.

As shown in FIG. 6, the method 600 includes establishing, for a BMS of a battery, an electric communication with a control unit of a device. See step 602. The electric communication is typically wired, but can also be implemented wirelessly.

The method 600 also includes receiving a controlling signal from the control unit. See step 604. Optionally, prior to the above step, the method 600 further includes providing electrical characteristics of the battery to the control unit. As disclosed herein, the controlling signal designates a conducting-on state or a conducting-off state of the battery, where the conducting-on state is a state in which the battery supplies an operating voltage (e.g., about 18 V to about 26.3 V) to one or more components of a device, and the conducting-off state is a state in which the battery is prevented from supplying the operating voltage to the one or more components of the device.

In one embodiment, the one or more components of the device may comprise at least a propulsion unit configured to provide a driving force to the device. In one embodiment, the aforementioned device is an unmanned aerial vehicle (UAV).

The method 600 further includes determining the supply of current from the one or more battery cores, and providing a low (safety) or high (operating) voltage to the device based on the controlling signal. See step 606. In one embodiment, controlling the conducting state of the battery based on the controlling signal may comprise operating a switch that controls the conducting-on state or the conducting-off state of the battery. For instance, in one such embodiment, the method 600 includes operating a switch such that the battery is in the conducting-on state and supplying the operating voltage to the one or more components of a device in response to receiving a first controlling signal designating the conducting-on state of the battery. In another such embodiment, the method 600 includes operating the switch such that the battery is in the conducting-off state and thereby prevented from supplying the operating voltage to the one or more components of the device in response to receiving a second controlling signal designating the conducting-off state of the battery.

In one embodiment, the method 600 may further comprise receiving an input signal from a power switch of the device, and controlling the battery to supply a safety voltage (e.g., about 3.3 V to about 17.8 V) to the control unit of the device in response to receiving the input signal.

Alternatively, in one embodiment, the battery automatically supplies a safety voltage to the control unit of the device in response to being physically connected to the device.

In one embodiment, one or more of the aforementioned steps in method 600 may be performed by a battery management system operatively coupled to the battery, the control unit, and the device.

Figure 7:
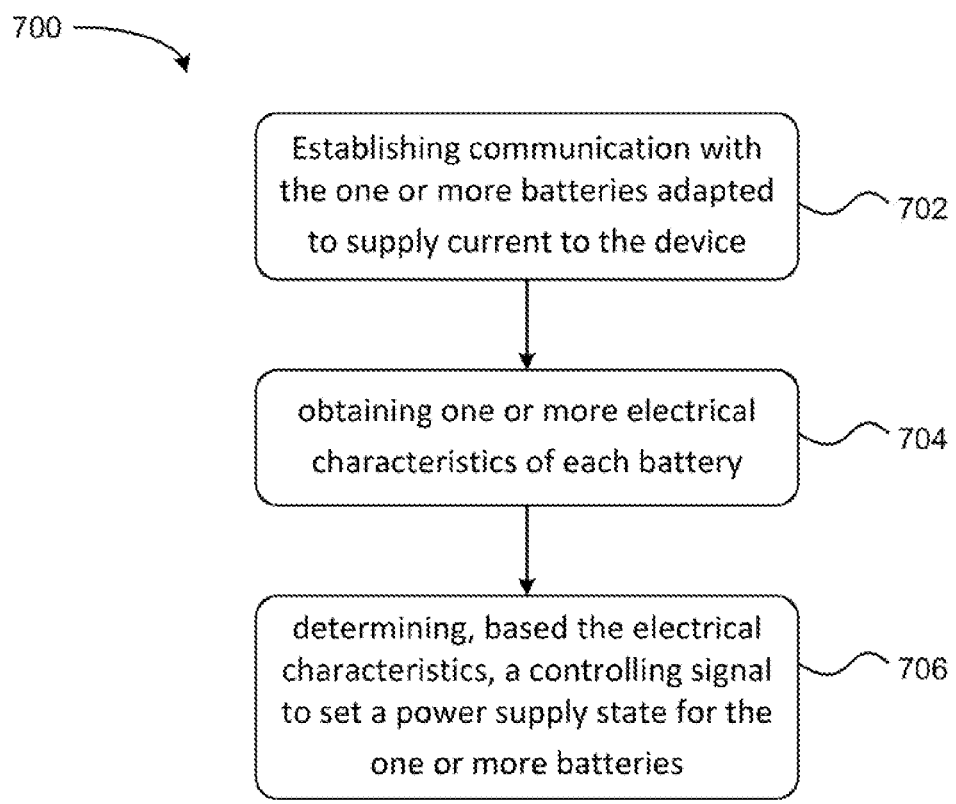
FIG. 7 presents a flowchart of a method of one embodiment of the present disclosure.

Referring now to FIG. 7, a flowchart of a method 700 for controlling a battery is shown according to one embodiment. The method 700 may be implemented in combination with other features, systems, and/or other methods described herein, such as those described with reference to other embodiments/aspects. Moreover, the method 700 may be used in various applications and/or in permutations, which may or may not be noted in the illustrative embodiments/aspects described herein. For instance, the method 700 may be carried out in any desired environment, and may include more or less steps than those described and/or illustrated in FIG. 7.

In one embodiment, the method 700 may be implemented in/by a system similar and/or substantially the same as system 100 of FIG. 1. For instance, the method 700 may be implemented in/by a system comprising at least one battery operatively coupled to a control unit.

As shown in FIG. 7, the method 700 includes establishing communication with at least one battery. See step 702.

The method 700 also includes obtaining one or more electrical characteristics of the battery. See step 704. In one embodiment, the electrical characteristics of the battery may correspond to a general status of the battery, a charge of the battery, percentage of the state of charge thereof, the continuous time of use remaining thereof, etc.

The method 700 further includes determining, based on the electrical characteristics, a controlling signal to set a power supply state for the one or more batteries. See step 706. As disclosed herein, the controlling signal sent to the battery designates a conducting-on state or a conducting-off state of the battery, where the conducting-on state of the battery is a state in which the battery supplies an operating voltage (e.g., about 18 V to about 26.3 V) to one or more components of the device, and the conducting-off state of the battery is a state in which the battery is prevented from supplying the operating voltage to the one or more components of the device. In some embodiments, the controlling signal includes further details specifying the level of voltage supplied from the battery.

In one embodiment, the one or more components of the device may comprise at least a propulsion unit configured to provide a driving force to the device. In one embodiment, the aforementioned device is an unmanned aerial vehicle (UAV).

In one embodiment, the method 700 includes determining whether the one or more electrical characteristics of the battery satisfy a predetermined condition prior to sending the controlling signal thereto. In one embodiment, the predetermined condition may be satisfied, at least in part, when the difference between the voltage of the battery and the highest battery voltage associated with the device is below a predetermined threshold. In one embodiment, the predetermined condition may be satisfied, at least in part, when the battery has a charge within a predetermined range.

In one embodiment, the method 700 may include sending a first controlling signal to the battery in response to determining that the battery satisfies the predetermined condition, the first controlling signal designating the conducting-on state. In one embodiment, the method 700 may include sending a second controlling signal to the battery in response to determining that the battery fails to satisfy the predetermined condition, the second controlling signal designating the conducting-off state.

In one embodiment in which it is determined that the battery does not satisfy the predetermined condition, the method 700 may include displaying an error message indicating that the battery failed to satisfy the predetermined condition. The error message may be displayed on a display device, a light source, etc. operatively coupled to the device and visible to a user.

In one embodiment, the method 700 may further include receiving a safety voltage (e.g., about 3.3 V to about 17.8 V) from the battery. In some embodiments, the safety voltage is received from the battery in response to the battery being physically connected to the device. In some embodiments, the safety voltage is received from the battery in response to the battery receiving an input signal from a power switch operatively coupled to the device. In another example, the low (safety) voltage can be provided in response to a controlling signal from the control unit and/or the BMS.

In one embodiment, one or more of the aforementioned steps of method 700 may be performed by a control unit operatively coupled to the battery and the device.

Figure 8A:
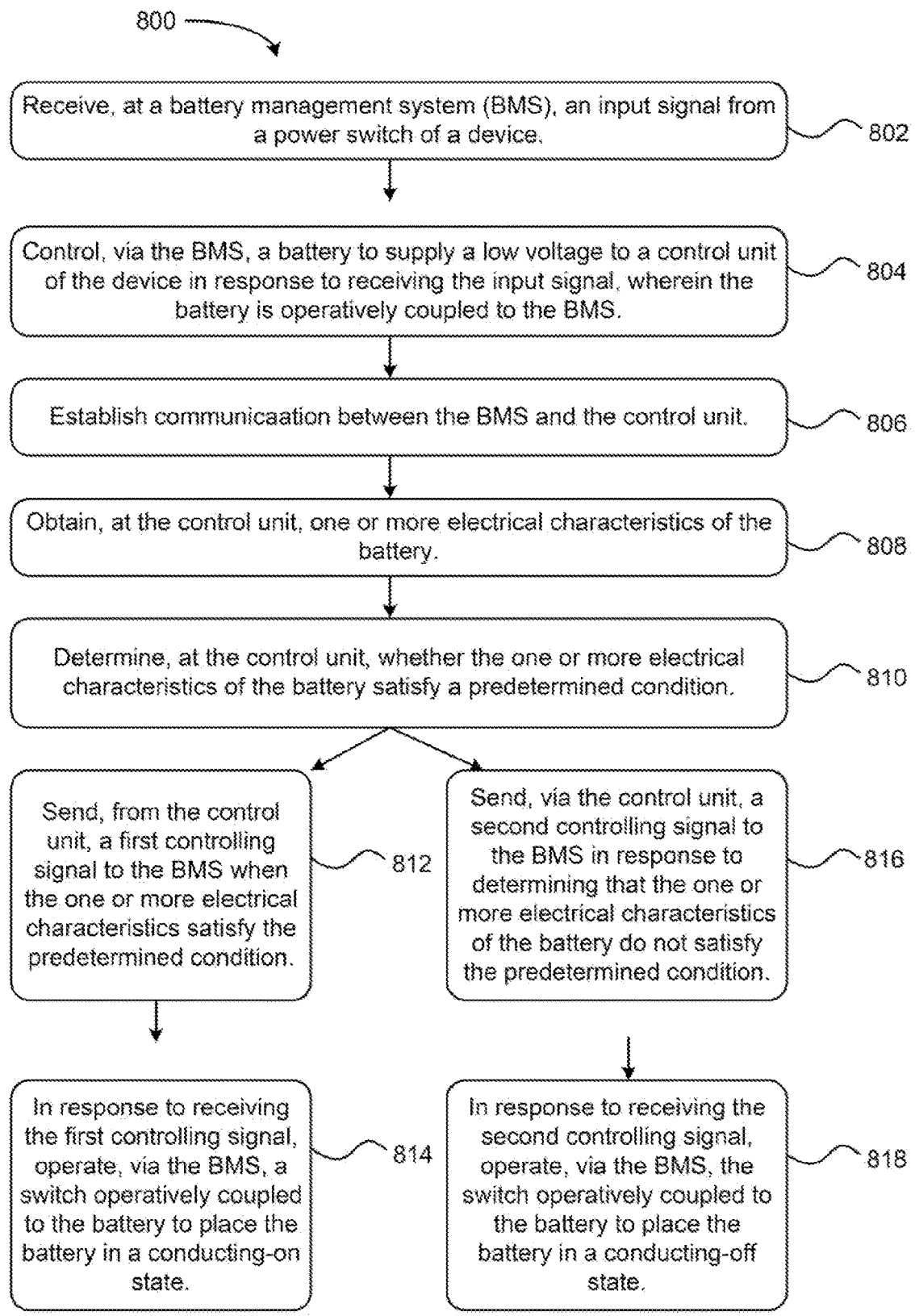
FIG. 8A presents a flowchart of a method of one embodiment of the present disclosure.

Referring now to FIG. 8A, a flowchart of a method 800 of communicating between a battery management system (BMS) and a control unit is shown according to one embodiment. The method 800 may be implemented in combination with other features, systems, and/or other methods described herein, such as those described with reference to other embodiments/aspects. Moreover, the method 800 may be used in various applications and/or in permutations, which may or may not be noted in the illustrative embodiments/aspects described herein. For instance, the method 800 may be carried out in any desired environment, and may include more or less steps than those described and/or illustrated in FIG. 8A.

In one embodiment, the method 800 may be implemented in/by a system similar and/or substantially the same as system 100 of FIG. 1. For instance, the method 800 may be implemented in/by a system comprising at least one battery operatively coupled to a control unit.

As shown in FIG. 8A, the BMS receives an input signal from a power input element (power switch) of the device at step 802. At step 804, the BMS controls a battery to supply a safety voltage (e.g., about 3.3 V to about 17.8 V) to the control unit in response to receiving the input signal from the power switch, wherein the battery is operatively coupled to the BMS.

At step 808, the BMS and control unit communicate, and the control unit obtains one or more electrical characteristics of the battery operatively coupled to the BMS at step 806. In one embodiment, the electrical characteristics of the battery (e.g., of the battery as a whole, or each enclosed battery core individually) may correspond to a general status of the battery, a charge of the battery, percentage of the state of charge thereof, the continuous time of use remaining thereof, etc. In one embodiment, the control unit may obtain the one or more electrical characteristics via the communication with the BMS, via communication with a voltage sensing device as disclosed herein, and/or via communication with a power measurement device as disclosed herein.

At step 810, the control unit determines whether the one or more electrical characteristics of the battery satisfy a predetermined condition. In one embodiment, the predetermined condition may be satisfied, at least in part, when the difference between the voltage of the battery and the highest battery voltage associated with the device is below a predetermined threshold. In one embodiment, the predetermined condition may be satisfied, at least in part, when the battery has a charge within a predetermined range.

If the control unit determines that the one or more electrical characteristics of the battery satisfy the predetermined condition, then control unit sends the first controlling signal to the BMS, wherein the first controlling signal designates a conducting-on state of the battery at step 812. The conducting-on state of the battery is a state in which the battery supplies an operating voltage (e.g., about 18 V to about 26.3 V) to one or more components of the device. At step 814, the BMS, in response to receiving the first controlling signal, operates a switch operatively coupled to the battery to place the battery in the conducting-on state.

In one embodiment, the one or more components of the device may comprise at least a propulsion unit configured to provide a driving force to the device. In one embodiment, the aforementioned device is an unmanned aerial vehicle (UAV).

If the control unit determines that the one or more electrical characteristics of the battery does not satisfy the predetermined condition, then the control unit sends a second controlling signal to the BMS, wherein the second controlling signal designates a conducting-off state of the battery at step 818. The conducting-off state of the battery is a state in which the battery is unable to supply the operating voltage to one or more components of the device. At step 818, the BMS, in response to receiving the second controlling signal, operates a switch operatively coupled to the battery to place the battery in the conducting-off state.

Figure 8B:
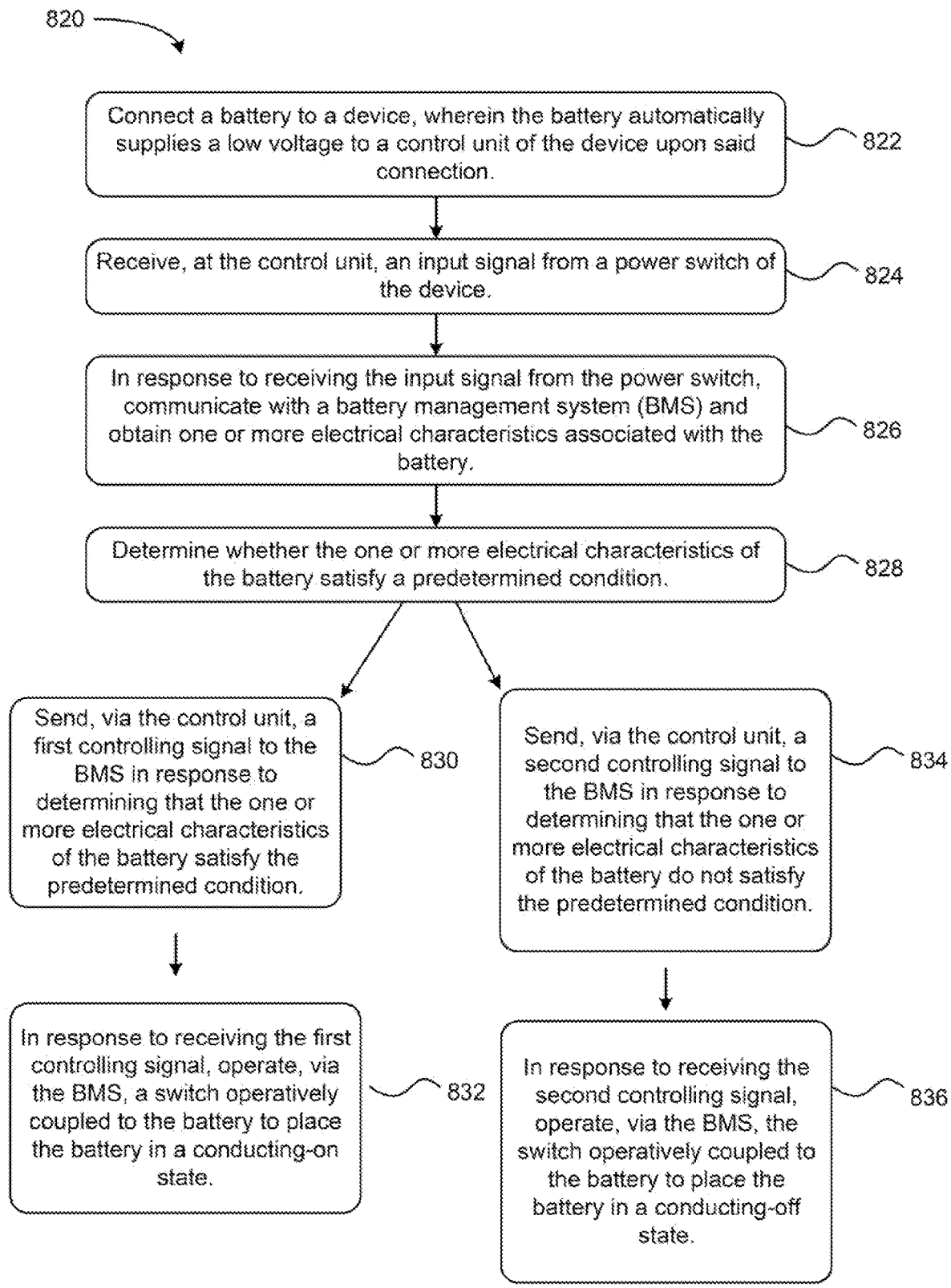
FIG. 8B presents a flowchart of a method of one embodiment of the present disclosure.

Referring now to FIG. 8B, a flowchart of a method 820 for communicating between a battery management system (BMS) and a control unit is shown according to another embodiment. The method 820 may be implemented in combination with other features, systems, and/or other methods described herein, such as those described with reference to other embodiments/aspects. Moreover, the method 820 may be used in various applications and/or in permutations, which may or may not be noted in the illustrative embodiments/aspects described herein. For instance, the method 820 may be carried out in any desired environment, and may include more or less steps than those described and/or illustrated in FIG. 8B.

In one embodiment, the method 820 may be implemented in/by a system similar and/or substantially the same as system 100 of FIG. 1. For instance, the method 820 may be implemented in/by a system comprising at least one battery operatively coupled to a control unit.

As shown in FIG. 8B, a battery is connected to a device, and automatically supplies a safety voltage (e.g., about 3.3 V to about 17.8 V) to the control unit of the device at step 822.

At step 824, the control unit receives an input signal from a power switch of the device. At step 826, in response to receiving the input signal from the power switch, the control unit communicates with the BMS and obtains one or more electrical characteristics of the battery, which is operatively coupled to the BMS. It is to be understood, however, that the BMS's can also be configured to communication with each other and coordinate the supply of power from the batteries, with or without the further assistance of the control unit. In one embodiment, the electrical characteristics of the battery may correspond to a general status of the battery, a charge of the battery, percentage of the state of charge thereof, the continuous time of use remaining thereof, etc. In one embodiment, the control unit may obtain the one or more electrical characteristics via the communication with the BMS, and/or via communication with a voltage sensing device as disclosed herein and/or a power measurement device as disclosed herein.

At step 828, the control unit determines whether the one or more electrical characteristics of the battery satisfy a predetermined condition. In one embodiment, the predetermined condition may be satisfied, at least in part, when the difference between the voltage of the battery and the highest battery voltage associated with the movable platform is below a predetermined threshold. In one embodiment, the predetermined condition may be satisfied, at least in part, when the battery has a charge within a predetermined range.

If the control unit determines that the one or more electrical characteristics of the battery satisfies the predetermined condition, then the control unit sends the first controlling signal to the BMS, wherein the first controlling signal designates a conducting-on state of the battery at step 830. The conducting-on state of the battery is a state in which the battery supplies an operating voltage (e.g., about 18 V to about 26.3 V) to one or more components of the device. At step 832, the BMS, in response to receiving the first controlling signal, operates a switch operatively coupled to the battery to place the battery in the conducting-on state.

In one embodiment, the one or more components of the device may comprise at least a propulsion unit configured to provide a driving force to the device. In one embodiment, the aforementioned device is an unmanned aerial vehicle (UAV).

If the control unit determines that the one or more electrical characteristics of the battery does not satisfy the predetermined condition, then the control unit sends a second controlling signal to the BMS, wherein the second controlling signal designates a conducting-off state of the battery at step 834. The conducting-off state of the battery is a state in which the battery is unable to supply the operating voltage to one or more components of the device. At step 836, the BMS, in response to receiving the second controlling signal, operates a switch operatively coupled to the battery to place the battery in the conducting-off state.

Figure 9:
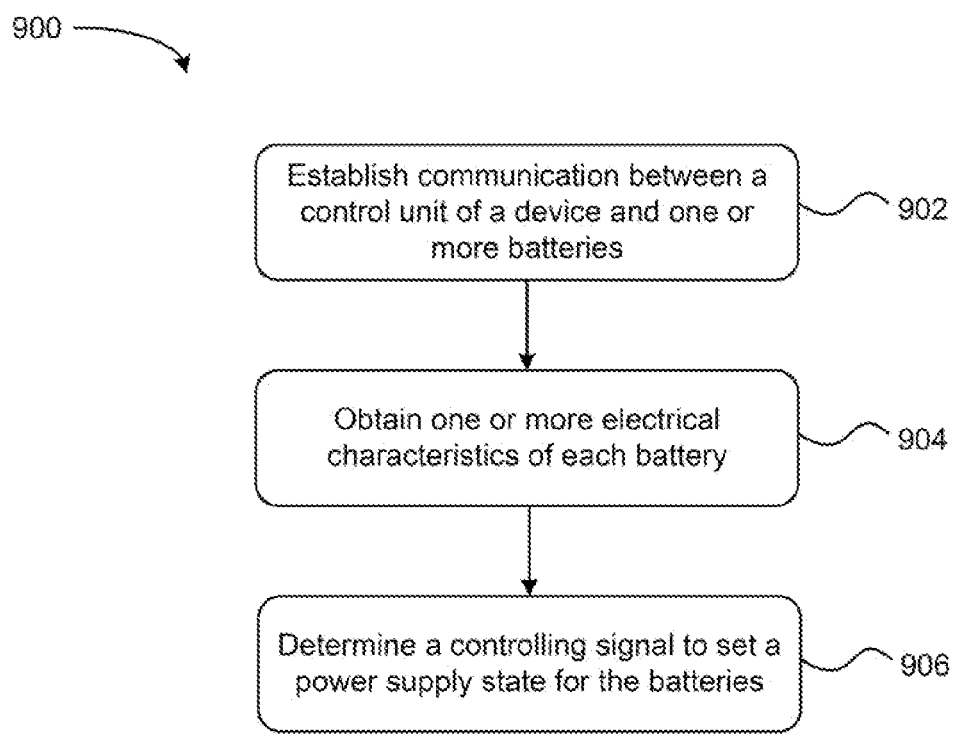
FIG. 9 presents a flowchart of a method of one embodiment of the present disclosure.

Referring now to FIG. 9, a flowchart of a method 900 for controlling one or more batteries according to one embodiment. The method 900 may be implemented in combination with other features, systems, and/or other methods described herein, such as those described with reference to other embodiments/aspects. Moreover, the method 900 may be used in various applications and/or in permutations, which may or may not be noted in the illustrative embodiments/aspects described herein. For instance, the method 900 may be carried out in any desired environment, and may include more or less steps than those described and/or illustrated in FIG. 9.

In one embodiment, the method 900 may be implemented in/by a system similar and/or substantially the same as system 100 of FIG. 1. For instance, the method 900 may be implemented in/by a system comprising at least one battery operatively coupled to a control unit. As shown in FIG. 9, the method 900 includes establishing, for a control unit of a device, communication with the one or more batteries adapted to supply current to the device; obtaining one or more electrical characteristics of each battery; and determining, based on the electrical characteristics, a controlling signal to set a power supply state (e.g., operating voltage, safety voltage or no voltage) for the one or more batteries. See steps 902, 904 and 906, respectively.

Figure 10:
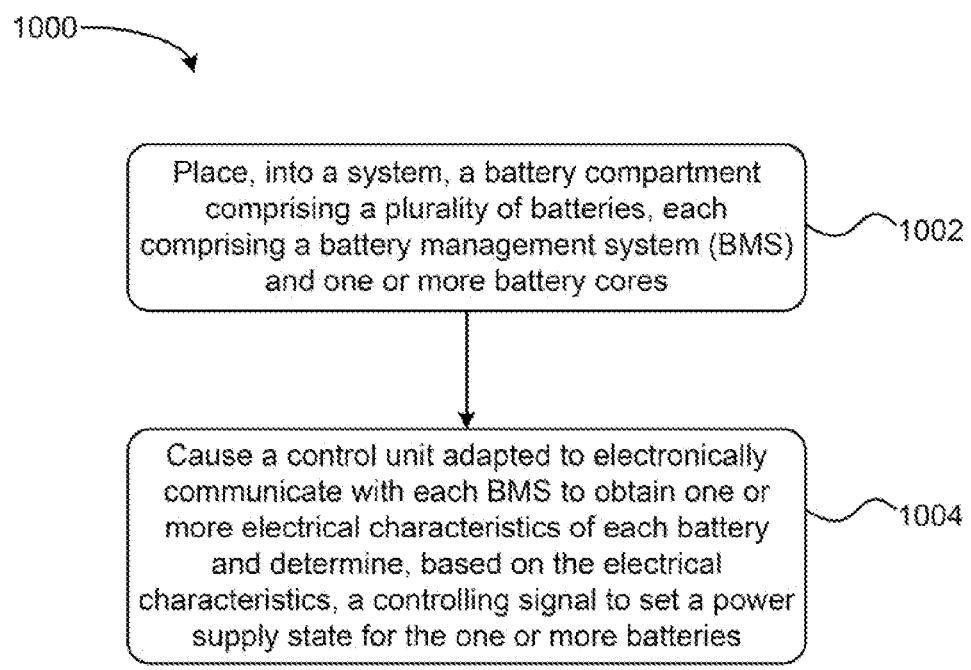
FIG. 10 presents a flowchart of a method of one embodiment of the present disclosure.

Referring now to FIG. 10, a flowchart of a method 1000 for supplying power to a system according to one embodiment. The method 1000 may be implemented in combination with other features, systems, and/or other methods described herein, such as those described with reference to other embodiments/aspects. Moreover, the method 1000 may be used in various applications and/or in permutations, which may or may not be noted in the illustrative embodiments/aspects described herein. For instance, the method 1000 may be carried out in any desired environment, and may include more or less steps than those described and/or illustrated in FIG. 10.

As shown in FIG. 10, the method 1000 includes placing, into a system, a battery compartment comprising a plurality of batteries, each comprising a battery management system (BMS) and one or more battery cores, wherein each battery is adapted to supply current to the system (1002); and causing a control unit adapted to electronically communicate with each BMS to: obtain one or more electrical characteristics of each battery; and determine, based on the electrical characteristics, a controlling signal to set a power supply state for the one or more batteries (1004).

Figure 11:
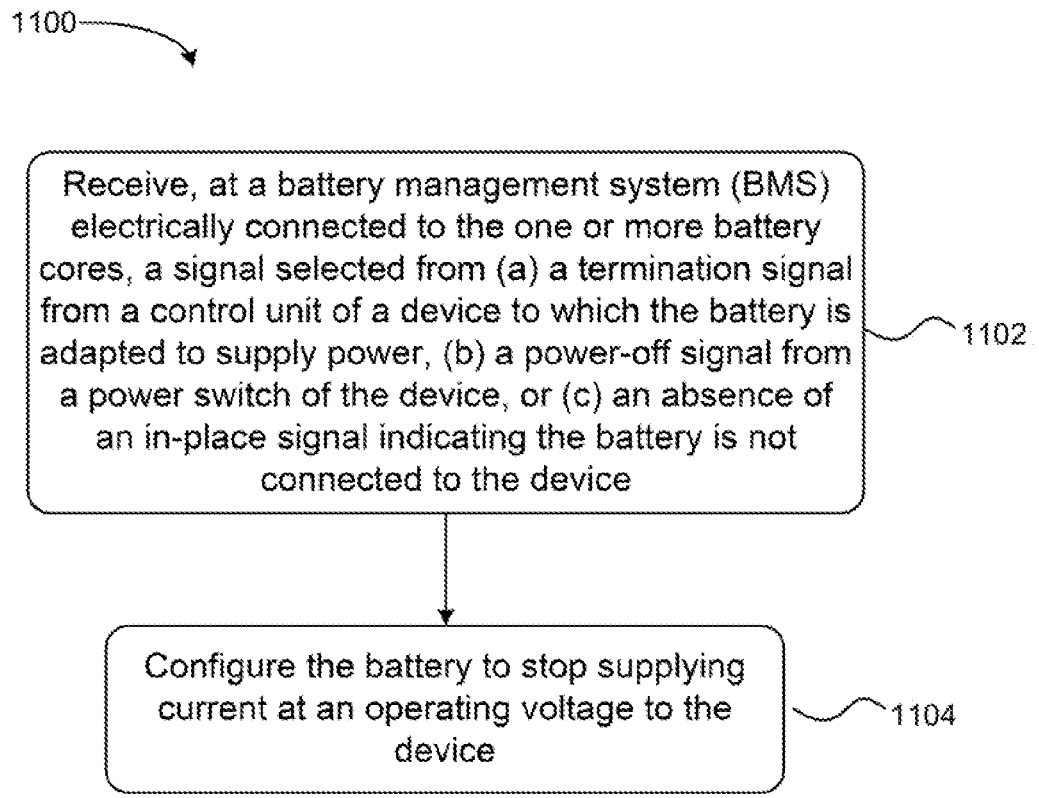
FIG. 11 presents a flowchart of a method of one embodiment of the present disclosure.

Likewise, a method of turning off the power supply from a battery pack is provided as illustrated in FIG. 11. The method, in this embodiment, entails receiving, at a battery management system (BMS) electrically connected to the one or more battery cores, a signal selected from (a) a termination signal from a control unit of a device to which the battery is adapted to supply power, (b) a power-off signal from a power switch of the device, or (c) an absence of an in-place signal (e.g., failure of detect an in-place signal within a predetermined time period) indicating the battery is not connected to the device (1102). The method then also includes configuring the battery to stop supplying current at an operating voltage to the device (1104).

Figure 12:
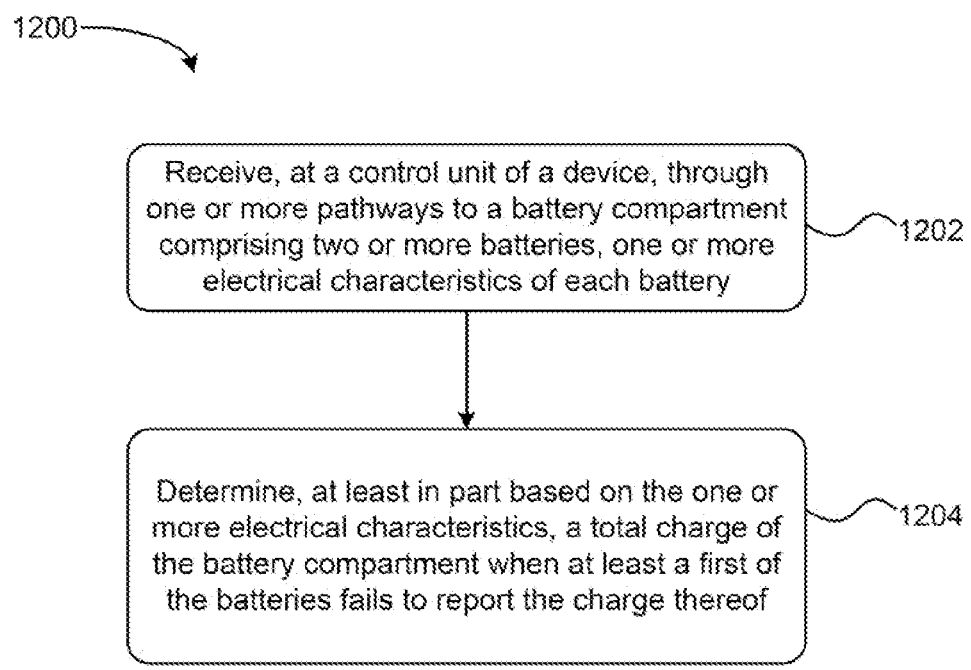
FIG. 12 presents a flowchart of a method of one embodiment of the present disclosure.

Now referring to FIG. 12, a flow chart of a method 1200 for estimating the total charge of a battery. At step 1202, the method includes receiving, at a control unit of a device, through one or more pathways to a battery compartment comprising two or more batteries, one or more electrical characteristics of each battery. At step 1204, the method determines, based at least in part on the one or more electrical characteristics, a total charge of the battery compartment when at least a first of the batteries fails to report the charge thereof.

Various embodiments of the present disclosure are further provided in the claims attached herein and summarized below. In one embodiment, the present disclosure provides a battery for supplying current to a device, comprising one or more battery cores; and a battery management system (BMS) electrically connected to the one or more battery cores and configured to receive a controlling signal from a control unit of the device; and control the one or more battery cores to supply current to the device based on the controlling signal.

In some embodiments, the battery is configured to constantly supply current at a safety voltage. In some embodiments, the battery is configured to supply current at a safety voltage upon connection to the device. In some embodiments, the supply of current at the safety voltage is in response to a switch action on the battery or on the device. In some embodiments, the supply of current at the safety voltage is not determined by the BMS. In some embodiments, the supply of current at the safety voltage is determined by the BMS according to the controlling signal.

In some embodiments, the battery further comprises a housing enclosing the one or more battery cores and the BMS. In some embodiments, the BMS is configured, according to the controlling signal, to determine to supply current at an operating voltage. In some embodiments, the BMS is further configured, according to the controlling signal, to determine to not supply current. In some embodiments, the BMS determines to supply current at the operating voltage when the controlling signal comprises a command for the battery to supply current to the device to conduct an operation. In some embodiments, the operation comprising physical movement of the device.

In some embodiments, the operating voltage is from about 18 V to about 26.3 V. In some embodiments, the safety voltage is from about 3.3 V to about 17.8 V. In some embodiments, the battery comprises separate pathways for supplying the operating voltage and the safety voltage.

In some embodiments, the BMS is further configured to examine whether the battery is connected to the device. In some embodiments, the BMS is configured to receive an in-place signal indicating connection of the battery to the device. In some embodiments, the signal is received from an electrode, a touch pin or a button in the battery. In some embodiments, the examination is periodic.

In some embodiments, the BMS is further configured to turn off the current at the operating voltage when the examination determines that an established connection is lost. In some embodiments, the in-place signal comprises a direct current signal or a pulse signal from the device. In some embodiments, the BMS is further configured to report one or more electrical characteristics of one or more of the battery cores to the control unit. In some embodiments, the one or more electrical characteristics comprise voltage or state of charge of the battery.

Also provided, in one embodiment, is a method for supplying power to a device, comprising establishing, for a battery management system (BMS) of a battery, an electric communication with a control unit of the device; receiving, at the BMS, a controlling signal from the control unit; and controlling the one or more battery cores to supply current to the device based on the controlling signal.

In another embodiment, provided is a battery management system (BMS) for managing power supply from a battery to a device, comprising a processor, a memory comprising program code which, when executed by the processor, configures the BMS to: establish an electric communication with a control unit of the device; receive a controlling signal from the control unit; and control one or more battery cores to supply current to the device based on the controlling signal.

Yet in another embodiment, provided is a non-transitory computer-readable medium comprising program code which, when executed by a processor in a battery management system (BMS) of a battery, configures the BMS to: establish an electric communication with a control unit of the device; receive a controlling signal from the control unit; and control one or more battery cores to supply current to the device based on the controlling signal.

In one embodiment, the present disclosure provides a movable platform, comprising: one or more propulsion units configured to provide a driving force to the movable platform; and a control unit operatively coupled to the one or more propulsion units and configured to: communicate with a plurality of batteries adapted to supply current to the one or more propulsion units; obtain one or more electrical characteristics of each of the plurality of batteries; and determine, based on the electrical characteristics, a controlling signal to set a power supply state for at least one of the plurality of batteries.

In some embodiments, the control unit is configured to operate under a safety voltage from the battery. In some embodiments, the control unit is further configured to determine whether the one or more electrical characteristics satisfy a predetermined condition. In some embodiments, the predetermined condition is satisfied, at least in part, when the maximum difference among the voltages of the plurality of batteries is below a predetermined threshold.

In some embodiments, the predetermined condition is satisfied, at least in part, when the state of charge of the plurality of batteries are within a predetermined range. In some embodiments, the one or more electrical characteristics comprise a voltage, a charge, or a number of completed charging cycles of each battery. In some embodiments, the voltage is reported by each of the plurality of batteries.

In some embodiments, the one or more electrical characteristics comprise a charging capacity of at least one of the plurality of batteries. In some embodiments, the control unit is further configured to estimate the state of charge based at least in part on the charging capacity. In some embodiments, the controlling signal comprises an instruction for each of the plurality of batteries to supply current at an operating voltage if the predetermined condition is satisfied. In some embodiments, the control unit is further configured to transmit an error signal if the predetermined condition is not satisfied.

In some embodiments, the movable platform comprises an unmanned aerial vehicle (UAV). In some embodiments, the moveable platform further comprises the plurality of batteries.

In one embodiment, provided is a method for controlling a plurality of batteries, the method comprising: establishing, for a control unit of a device, communication with the plurality of batteries adapted to supply current to the device; obtaining one or more electrical characteristics of each of the plurality of batteries; and determining, based on the electrical characteristics, a controlling signal to set a power supply state for the plurality of batteries.

Still, in one embodiment, provided is a control system for controlling plurality of batteries, comprising a processor, a memory and program code which, when executed by the processor, configures the control system to: establish communication with the plurality of batteries adapted to supply current to a device; obtain one or more electrical characteristics of each of the plurality of batteries; and determine, based on the electrical characteristics, a controlling signal to set a power supply state for the plurality of batteries.

Also provided, in one embodiment, is a non-transitory computer-readable medium comprising program code which, when executed by a process in a control unit of a device, configures the control to: establish communication with the one or more batteries adapted to supply current to the device; obtain one or more electrical characteristics of each battery; and determine, based on the electrical characteristics, a controlling signal to set a power supply state for the one or more batteries.

Yet the disclosure, in one embodiment, provides a system, comprising: a battery compartment comprising a plurality of batteries, each comprising a battery management system (BMS) and one or more battery cores, wherein each battery is adapted to supply current to the system; and a control unit adapted to electronically communicate with each BMS, wherein the control unit is configured to: obtain one or more electrical characteristics of each battery; and determine, based on the electrical characteristics, a controlling signal to set a power supply state for the one or more batteries.

In some embodiments, the system further comprises a power switch. In some embodiments, at least one of the BMS is configured to receive a power-on signal from the power switch and, in response to the power-on signal, configure the respective battery to supply current at a safety voltage to the control unit. In some embodiments, the control unit is further configured to request, from each BMS, one or more electrical characteristics for the respective battery. In some embodiments, the control unit is further configured to determine whether the electrical characteristics satisfy a predetermined condition. In some embodiments, the predetermined condition comprises a level of the maximum difference among voltages of the one or more batteries.

In some embodiments, the controlling signal comprises an instruction for each of the one or more batteries to supply current at an operating voltage if the predetermined condition is satisfied. In some embodiments, the control unit is further configured to transmit an error signal if the predetermined condition is not satisfied. In some embodiments, at least one of the BMS is further configured to receive an in-place signal indicating that the battery compartment is in electrically connected to the system. In some embodiments, the BMS, in response to receiving the in-place signal, configures the respective battery to supply current at a safety voltage to the control unit.

In some embodiments, the control unit is configured to receive a power-on signal from the system and, in response to the power-on signal, request, from each BMS, one or more electrical characteristics for the respective battery. In some embodiments, the control unit is further configured to determine whether the electrical characteristics satisfy a predetermined condition. In some embodiments, the predetermined condition comprises a level of the maximum difference among voltages of the one or more batteries.

In some embodiments, the controlling signal comprises an instruction for each of the one or more batteries to supply current at an operating voltage if the predetermined condition is satisfied. In some embodiments, the control unit is further configured to transmit an error signal if the predetermined condition is not satisfied. In some embodiments, the device is an unmanned aerial vehicle (UAV).

Still further, one embodiment of the present disclosure provides a method of supplying power to a system, comprising: securing, into the system, a battery compartment comprising a plurality of batteries, each of the plurality of batteries comprising a battery management system (BMS) and one or more battery cores, wherein each battery is adapted to supply current to the system; and causing a control unit adapted to electronically communicate with the BMS of each of the plurality of batteries to: obtain one or more electrical characteristics of each battery; and determine, based on the electrical characteristics, a controlling signal to set a power supply state for at least one of the plurality of batteries.

In another embodiment, a battery is provided for supplying current to a device, comprising: a housing; one or more battery cores disposed in the housing; and a battery management system (BMS) electrically connected to the one or more battery cores and configured to: receive a signal selected from a group consisting of (a) a termination signal from a control unit of a device to which the battery is adapted to supply power, (b) a power-off signal from a power switch of the device, and (c) an absence of an in-place signal received within a predetermined period of time, indicating the battery is not connected to the device; and configure the battery cores to stop supplying current at an operating voltage to the device.

In some embodiments, the BMS is configured to examine availability of the in-place signal. In some embodiments, the examination is periodic. In some embodiments, the in-place signal comprises a direct current signal or a pulse signal from the device. In some embodiments, the BMS is further configured to keep the battery cores to supply current as a safety voltage. In some embodiments, the BMS is further configured to shut off all current from the battery cores.

Yet another embodiment provides a method for controlling power supply from a battery to a device, comprising: receiving, at a battery management system (BMS) electrically connected to the one or more battery cores, a signal selected from (a) a termination signal from a control unit of a device to which the battery is adapted to supply power, (b) a power-off signal from a power switch of the device, or (c) an absence of an in-place signal received within a predetermined period of time, indicating the battery is not connected to the device; and configuring the battery cores to stop supplying current at an operating voltage to the device.

In one embodiment, provided is a battery management system (BMS) for controlling power supply from one or more battery cores in a battery to a device, comprising a processor, a memory and program code which, when executed by the processor, configures the BMS to:

receive a signal selected from (a) a termination signal from a control unit of a device to which the battery is adapted to supply power, (b) a power-off signal from a power switch of the device, or (c) an absence of an in-place signal received within a predetermined period of time, indicating the battery is not connected to the device; and configure the battery cores to stop supplying current at an operating voltage to the device.

Also provided, in one embodiment, is a non-transitory computer-readable medium comprising program code which, when executed by a processor in a battery management system (BMS) electrically connected to the one or more battery cores, configures the BMS to: receive a signal selected from (a) a termination signal from a control unit of a device to which the battery is adapted to supply power, (b) a power-off signal from a power switch of the device, or (c) an absence of an in-place signal received within a predetermined period of time, indicating the battery is not connected to the device; and configure the battery to stop supplying current at an operating voltage to the device.

A movable platform is provided, in one embodiment, comprising: one or more propulsion units configured to provide a driving force to the movable platform; one or more electric components; a control unit operatively coupled to the one or more propulsion units and the one or more electric components; one or more operating voltage terminals configured to allow a battery, when connected to the platform, to apply an operating voltage on the one or more propulsion units; one or more safety voltage terminals configured to allow the battery to apply a safety voltage to the one or more electric components or the control unit, wherein the one or more operating voltage terminals are not the same as the one or more safety voltage terminals; and one or more communication terminals configured to allow the control unit to communicate with the battery and control the supply of power from the battery to the one or more propulsion units or the one or more electric components.

In some embodiments, the control unit is further configured to instruct the battery to supply current to the one or more propulsion units at the operating voltage, after the battery is connected to the movable platform. In some embodiments, the one or more electric components are supplied with current at a safety voltage when the movable platform is connected to the battery. In some embodiments, the control unit is further configured to instruct the battery to supply current to the one or more electric components at the safety voltage, after the battery is connected to the movable platform. In some embodiments, the one or more electric components comprises one or more components selected from the group consisting of a flight controller, a positioning unit, a barometer, an image sensor, a wireless communication unit and combinations thereof.

In some embodiments, the operating voltage is from about 18 V to about 26.3 V. In some embodiments, the safety voltage is from about 3.3 V to about 17.8 V. In some embodiments, the movable platform further comprises the battery.

In some embodiments, the battery comprises one or more operating voltage terminals for connecting to the one or more operating terminals of the movable platform and configured to supply current at the operating voltage, one or more safety voltage terminals for connected to the one or more safety voltage terminals of the movable platform and configured to supply current at a safety voltage, and one or more communication terminal for connecting to the one or more communication terminals of the movable platform and configured to communicate with the control unit.

Another embodiment of the disclosure provides a battery for supplying current to a device, comprising: a housing; one or more battery cores disposed in the housing; a battery management system (BMS) electrically connected to the one or more battery cores and a plurality of terminals, wherein the terminals comprises: one or more operating voltage terminals configured to allow a battery to apply an operating voltage on the device, one or more safety voltage terminals configured to allow the battery to apply a safety voltage to the device, wherein the one or more operating voltage terminals are not the same as the one or more safety voltage terminals, and one or more communication terminals configured to allow the BMS to communicate with the device and control the supply of power from the battery to the device.

Another embodiment provides a movable platform comprising: a power switch; one or more propulsion units configured to provide a driving force to the movable platform; and a control unit operatively coupled to the one or more propulsion units, wherein the control unit and the power switch are configured to electrically communicate with a battery through a common pathway.

In some embodiments, the movable platform does not include a separate communication pathway between the power switch and the battery. In some embodiments, the movable platform further comprises a connection interface for connecting with the battery. In some embodiments, the connection interface includes a signal connector for the common pathway. In some embodiments, the movable platform further comprises the battery.

Another embodiment provides a battery, comprising: a housing; one or more battery cores disposed in the housing; a battery management system (BMS); and a separator disposed, in series, between the one or more battery cores and a terminal, wherein the separator comprises two or more transistors.

In some embodiments, the separator comprises two transistors, a first transistor and a second transistor, which can be connected in series. The first transistor can be of the same type as the second transistor or can be different. In some embodiments, the two transistors are connected at inverse directions. In some embodiments, the transistors comprise a metal oxide semiconductor field effect transistors (MOSFET). In some embodiments, the MOSFET is an n-channel MOSFET. In some embodiments, the n-channel MOSFET comprises an insulating layer having a high resistance.

In some embodiments, the insulating layer comprises silicon dioxide. In some embodiments, a signal output from the separator is substantially the same as a signal received at the separator. In some embodiments, the terminal is configured to receive a switch signal from an external device, the switch signal controlling the battery to supply current. In some embodiments, the terminal is configured to enable communication between the BMS and a control unit of the external device.

Another embodiment provides a movable platform comprising: one or more propulsion units configured to provide a driving force to the movable platform; one or more electric components; a control unit operatively coupled to the one or more propulsion units and the one or more electric components, one or more terminals configured to allow the control unit to communicate with the battery and control the supply of power from the battery to the one or more propulsion units or the one or more electric components; and a separator disposed, in series, between the control unit and one of the one or more the terminals, wherein the separator comprises two or more transistors.

In another embodiment, provided is a movable platform, comprising: one or more propulsion units configured to provide a driving force to the movable platform; and a control unit operatively coupled to the one or more propulsion units and configured to: receive, through one or more pathways to a battery compartment comprising two or more batteries, one or more electrical characteristics of each battery; and determine, based at least in part on the one or more electrical characteristics, a state of charge of the battery compartment when at least a first battery of the batteries fails to report the charge thereof.

In some embodiments, at least a second battery of the batteries is able to report the state of charge thereof through a second of the pathways. In some embodiments, the control unit receives the one or more electrical characteristics from the first battery through a first of the pathways. In some embodiments, the one or more electrical characteristics from the first battery comprise a voltage output. In some embodiments, the determination further takes an input a total capacity of each of the batteries. In some embodiments, the movable platform comprises an unmanned aerial vehicle (UAV).

A method is provided, in another embodiment, comprising: receiving, at a control unit of a device, through one or more pathways to a battery compartment comprising two or more batteries, one or more electrical characteristics of each battery; and determining, based at least in part on the one or more electrical characteristics, a state of charge of the battery compartment when at least a first of the batteries fails to report the charge thereof.

In some embodiments, at least a second of the batteries is able to report the state of charge thereof through a second of the pathways. In some embodiments, the control unit receives the one or more electrical characteristics from the first battery through a first of the pathways. In some embodiments, the one or more electrical characteristics from the first battery comprise a voltage output. In some embodiments, the determination further takes an input a total capacity of each of the batteries. In some embodiments, the movable platform comprises an unmanned aerial vehicle (UAV).

Another embodiment provides a control system comprising a processor, a memory and program code which, when executed by the processor, configures the control system to: receive, through one or more pathways to a battery compartment comprising two or more batteries, one or more electrical characteristics of each battery; and determine, based at least in part on the one or more electrical characteristics, a state of charge of the battery compartment when at least a first of the batteries fails to report the charge thereof.

Still another embodiment provides a non-transitory computer-readable medium comprising program code which, when executed by a processor in a control unit of a device, configures the control unit to: receive, through one or more pathways, to a battery compartment comprising two or more batteries, one or more electrical characteristics of each battery; and determine, based at least in part on the one or more electrical characteristics, a state of charge of the battery compartment when at least a first of the batteries fails to report the charge thereof.

As discussed previously, features of the present disclosure can be implemented in, using, or with the assistance of a computer program product which is a non-transitory storage medium (media) or a non-transitory computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems and execution environments/containers.

Features of the disclosure may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

What is claimed is:

1. A movable platform, comprising:
   one or more propulsion units configured to provide a driving force to the movable platform; and
   a control unit operatively coupled to the one or more propulsion units and configured to:
   communicate with a plurality of batteries adapted to supply current to the one or more propulsion units;
   obtain one or more electrical characteristics of each of the plurality of batteries; and
   determine, based on the electrical characteristics, a controlling signal to set a power supply state for at least one of the plurality of batteries, wherein:
   the control unit is configured to operate under a safety voltage, and
   the control unit sets the power supply state of the at least one of the plurality of batteries to an operating voltage that is higher than the safety voltage for supplying the movable platform when (1) a maximum difference among voltages of the plurality of batteries is below a predetermined threshold, and (2) states of charge of the plurality of batteries are within a predetermined range.

2. The movable platform of claim 1, wherein the one or more electrical characteristics comprise: a voltage, a charge, and a number of completed charging cycles of each battery.

3. The movable platform of claim 2, wherein the voltage is reported by each of the plurality of batteries.

4. The movable platform of claim 1, wherein the one or more electrical characteristics comprise a charging capacity of the at least one of the plurality of batteries.

5. The movable platform of claim 4, wherein the control unit is further configured to estimate a state of charge based at least in part on the charging capacity.

6. The movable platform of claim 5, wherein the controlling signal comprises:
   an instruction for each of the plurality of batteries to, in response to a predetermined condition being satisfied, supply current at the operating voltage.

7. The movable platform of claim 5, wherein the control unit is further configured to:
   in response to a predetermined condition not being satisfied, transmit an error signal to a battery management system (BMS) in electric communication with the control unit.

8. A battery for supplying current to a movable platform, comprising:
   one or more battery cores; and
   a battery management system (BMS) electrically connected to the one or more battery cores and configured to:
   receive a controlling signal from a control unit of the movable platform; and
   control the one or more battery cores to supply current to the movable platform based on the controlling signal,
   wherein the one or more battery cores are configured to supply current at a safety voltage upon a connection to the movable platform, the supply of current at the safety voltage being determined by the BMS according to the controlling signal,
   wherein the battery is one of a plurality of batteries, and
   wherein the one or more battery cores are configured to supply current at an operating voltage that is higher than the safety voltage upon the connection to the movable platform, the supply of current at the operating voltage being determined by the BMS according to the controlling signal when (1) a maximum difference among voltages of the plurality of batteries is below a predetermined threshold, and (2) states of charge of the plurality of batteries are within a predetermined range.

9. The battery of claim 8, wherein the BMS is further configured, according to the controlling signal, to determine to not supply current.

10. The battery of claim 8, wherein the BMS determines to supply current at the operating voltage when the controlling signal comprises a command for the one or more battery cores to supply current to the movable platform to conduct an operation, the operation comprising a physical movement of the movable platform.

11. The battery of claim 8, wherein the operating voltage and the safety voltage are supplied through separate pathways.

12. The battery of claim 8, wherein: the BMS is further configured to examine whether the battery is connected to the movable platform.

13. The battery of claim 12, wherein: the BMS is configured to receive an in-place signal indicating the connection of the battery to the movable platform, the in-place signal comprising a direct current signal or a pulse signal from the movable platform.

14. The battery of claim 13, wherein the signal is received from an electrode, a touch pin or a button in the battery.

15. The battery of claim 14, wherein the BMS is further configured to turn off the current at the operating voltage when the examination determines that an established connection is lost.

* * * * *